United States Patent
Kooken et al.

(10) Patent No.: US 9,956,639 B2
(45) Date of Patent: *May 1, 2018

(54) MODULAR POWER SOURCE FOR ELECTRIC ARC WELDING AND OUTPUT CHOPPER

(75) Inventors: Todd E. Kooken, University Hts., OH (US); Lifeng Luo, Solon, OH (US)

(73) Assignee: LINCOLN GLOBAL, INC, Monterey, CA (US)

( * ) Notice: Subject to any disclaimer, the term of this patent is extended or adjusted under 35 U.S.C. 154(b) by 1357 days.

This patent is subject to a terminal disclaimer.

(21) Appl. No.: 11/051,196

(22) Filed: Feb. 7, 2005

(65) Prior Publication Data

US 2006/0175313 A1    Aug. 10, 2006

(51) Int. Cl.
    *B23K 9/10*    (2006.01)
    *B23K 9/173*    (2006.01)
    *B23K 9/09*    (2006.01)

(52) U.S. Cl.
    CPC .............. *B23K 9/173* (2013.01); *B23K 9/09* (2013.01); *B23K 9/1043* (2013.01); *B23K 9/1075* (2013.01)

(58) Field of Classification Search
    USPC .............. 219/130.1, 130.51, 137 PS, 130.21
    See application file for complete search history.

(56) References Cited

U.S. PATENT DOCUMENTS

| | | |
|---|---|---|
| 3,459,920 A | 8/1969 | Sevenco |
| 3,737,755 A | 6/1973 | Calkin |
| 3,809,853 A | 5/1974 | Manz |
| 3,904,846 A | 9/1975 | Risberg |
| 3,984,799 A | 10/1976 | Fletcher et al. |

(Continued)

FOREIGN PATENT DOCUMENTS

| | | |
|---|---|---|
| AU | 2005237177 A1 | 10/2006 |
| AU | 2007200934 A1 | 5/2008 |

(Continued)

OTHER PUBLICATIONS

*Sinusoidal Line Current Rectification with a 100 kHz B-Sit Step-Up Converter* by Ned Mohan, Tore M. Undeland and Ralph J. Ferraro—1984.

(Continued)

*Primary Examiner* — Thien S Tran
(74) *Attorney, Agent, or Firm* — Perkins Coie LLP

(57) ABSTRACT

A three stage power source for an electric arc welding process comprising an input stage having an AC input and a first DC output signal; a second stage in the form of an unregulated DC to DC converter having an input connected to the first DC output signal, a network of switches switched at a high frequency with a given duty cycle to convert the input into a first internal AC signal, an isolation transformer with a primary winding driven by the first internal high frequency AC signal and a secondary winding for creating a second internal high frequency AC signal and a rectifier to convert the second internal AC signal into a second DC output signal of the second stage; with a magnitude related to the duty cycle of the switches and, a third stage to convert the second DC output signal to a welding output for welding wherein the input stage and the second stage are assembled into a first module and the third stage is assembled into a second module connectable to the first module.

68 Claims, 19 Drawing Sheets

(56) References Cited

U.S. PATENT DOCUMENTS

| | | | |
|---|---|---|---|
| 4,020,320 A | 4/1977 | Pijls | |
| 4,020,361 A | 4/1977 | Suelzle | |
| 4,049,946 A | 9/1977 | Fluckiger | |
| 4,125,759 A | 11/1978 | Kiyohara | |
| 4,201,906 A | 5/1980 | Puschner | |
| 4,225,769 A | 9/1980 | Wilkins | |
| 4,245,285 A | 1/1981 | Weiss | |
| 4,403,269 A | 9/1983 | Carroll | |
| 4,409,465 A | 10/1983 | Yamamoto | |
| 4,417,197 A | 11/1983 | Schwarz | |
| 4,425,613 A | 1/1984 | Shelly | |
| 4,433,370 A | 2/1984 | Karadsheh et al. | |
| 4,442,339 A | 4/1984 | Mizuno | |
| 4,442,370 A | 4/1984 | Veyssiere | |
| 4,447,695 A * | 5/1984 | Inoue | 219/69.13 |
| 4,485,293 A | 11/1984 | Tabata | |
| 4,494,180 A | 1/1985 | Streater | |
| 4,503,316 A | 3/1985 | Murase et al. | |
| 4,518,844 A | 5/1985 | Needham | |
| 4,521,671 A | 6/1985 | Fronius | |
| 4,521,672 A | 6/1985 | Fronius | |
| 4,533,986 A | 8/1985 | Jones | |
| 4,540,892 A | 9/1985 | Carvalho | |
| 4,546,234 A | 10/1985 | Ogasawara | |
| 4,564,742 A | 1/1986 | Karlsson | |
| 4,618,919 A | 10/1986 | Martin, Jr. | |
| 4,635,181 A | 1/1987 | Bourgeault | |
| 4,677,366 A | 6/1987 | Wilkinson | |
| 4,677,667 A | 6/1987 | Burns | |
| 4,720,667 A | 1/1988 | Lee | |
| 4,720,668 A | 1/1988 | Lee | |
| 4,748,397 A | 5/1988 | Ogawa | |
| 4,779,184 A | 10/1988 | White | |
| 4,855,888 A | 8/1989 | Henze et al. | |
| 4,857,822 A | 8/1989 | Tabisz | |
| 4,864,479 A | 9/1989 | Steigerwald | |
| 4,866,247 A | 9/1989 | Parks | |
| 4,889,969 A | 12/1989 | Kawai | |
| 4,904,843 A | 2/1990 | Hori | |
| 4,924,170 A | 5/1990 | Henze | |
| 4,963,715 A | 10/1990 | Tuttle | |
| 4,964,026 A | 10/1990 | Locascio | |
| 5,001,326 A | 3/1991 | Stava | |
| 5,001,623 A | 3/1991 | Magid | |
| 5,008,795 A | 4/1991 | Parsley | |
| 5,019,952 A | 5/1991 | Smolenski | |
| 5,066,900 A | 11/1991 | Bassett | |
| 5,113,337 A | 5/1992 | Steigerwald | |
| 5,130,561 A | 7/1992 | Elliott et al. | |
| 5,149,933 A | 9/1992 | Donner | |
| 5,172,309 A | 12/1992 | DeDoncher et al. | |
| 5,220,151 A * | 6/1993 | Terayama et al. | 219/130.32 |
| 5,225,660 A | 7/1993 | Mita | |
| 5,235,504 A | 8/1993 | Sood | |
| 5,245,525 A | 9/1993 | Galloway et al. | |
| 5,272,313 A | 12/1993 | Karino | |
| 5,278,390 A | 1/1994 | Blankenship | |
| 5,319,533 A | 6/1994 | Reynolds | |
| 5,321,348 A | 6/1994 | Vinciarelli | |
| 5,343,017 A | 8/1994 | Karino | |
| 5,343,140 A | 8/1994 | Gegner | |
| 5,349,149 A | 9/1994 | Shiraki et al. | |
| 5,349,157 A | 9/1994 | Blankenship | |
| 5,349,159 A | 9/1994 | Mita et al. | |
| 5,351,175 A | 9/1994 | Blankenship | |
| 5,367,448 A | 11/1994 | Carroll | |
| 5,402,060 A | 3/1995 | Erisman | |
| 5,406,051 A | 4/1995 | Lai | |
| 5,414,238 A | 5/1995 | Steigerwald et al. | |
| 5,414,613 A | 5/1995 | Chen | |
| 5,418,704 A | 5/1995 | Hua et al. | |
| 5,434,768 A | 7/1995 | Jitaru et al. | |
| 5,440,179 A | 8/1995 | Severinsky | |
| 5,444,356 A | 8/1995 | Reynolds et al. | |
| 5,465,011 A | 11/1995 | Miller | |
| 5,477,131 A | 12/1995 | Gegner | |
| 5,543,704 A | 8/1996 | Thoren | |
| 5,601,741 A | 2/1997 | Thommes | |
| 5,612,609 A | 3/1997 | Choi | |
| 5,615,095 A | 3/1997 | Reynolds et al. | |
| 5,615,098 A | 3/1997 | Ishii | |
| 5,636,114 A | 6/1997 | Bhagwat | |
| 5,710,696 A | 1/1998 | Reynolds | |
| 5,715,150 A | 2/1998 | Stava | |
| 5,747,972 A * | 5/1998 | Baretich et al. | 323/223 |
| 5,760,372 A | 6/1998 | Karino et al. | |
| 5,771,163 A | 6/1998 | Moriguchi | |
| 5,777,860 A | 7/1998 | Halbert | |
| 5,786,992 A | 7/1998 | Vinciarelli | |
| 5,790,389 A | 8/1998 | Hua | |
| 5,796,595 A | 8/1998 | Cross | |
| 5,811,757 A | 9/1998 | Higgins | |
| 5,824,990 A | 10/1998 | Geissler | |
| 5,825,642 A | 10/1998 | Ishii | |
| 5,831,240 A | 11/1998 | Katooka | |
| 5,847,942 A | 12/1998 | Bazinet et al. | |
| 5,864,116 A | 1/1999 | Baker | |
| 5,867,374 A | 2/1999 | Moreau | |
| 5,874,826 A | 2/1999 | Chen | |
| 5,875,104 A | 2/1999 | Prager | |
| 5,894,414 A | 4/1999 | Jiang | |
| 5,917,711 A | 6/1999 | Shikata | |
| 5,926,381 A | 7/1999 | Moriguchi | |
| 5,990,445 A | 11/1999 | Ogasawara et al. | |
| 5,991,169 A | 11/1999 | Kooken | |
| 5,991,180 A | 11/1999 | Vogel | |
| 6,023,037 A | 2/2000 | Church et al. | |
| 6,023,154 A | 2/2000 | Martinez | |
| 6,023,416 A | 2/2000 | Shikata | |
| 6,031,737 A | 2/2000 | Green | |
| 6,051,804 A | 4/2000 | Reynolds et al. | |
| 6,051,806 A | 4/2000 | Shikata | |
| 6,054,674 A | 4/2000 | Moriguchi | |
| 6,055,161 A | 4/2000 | Church | |
| 6,067,241 A | 5/2000 | Lu | |
| 6,069,801 A | 5/2000 | Hodge | |
| 6,069,811 A | 5/2000 | Moriguchi et al. | |
| 6,087,628 A | 7/2000 | Ferkel | |
| 6,091,612 A | 7/2000 | Blankenship | |
| 6,101,105 A | 8/2000 | Gilmore | |
| 6,115,273 A | 9/2000 | Geissler | |
| 6,177,645 B1 | 1/2001 | Church et al. | |
| 6,188,585 B1 | 2/2001 | Ikeda | |
| 6,198,642 B1 | 3/2001 | Kociecki | |
| 6,207,927 B1 * | 3/2001 | Mita et al. | 219/130.51 |
| 6,207,929 B1 | 3/2001 | Mita et al. | |
| 6,211,657 B1 | 4/2001 | Goluszek | |
| 6,236,014 B1 | 5/2001 | Ulrich | |
| 6,268,587 B1 | 7/2001 | Kooken | |
| 6,278,080 B1 | 8/2001 | Moriguchi et al. | |
| 6,291,798 B1 | 9/2001 | Stava | |
| 6,300,589 B1 | 9/2001 | Reynolds et al. | |
| 6,329,636 B1 | 12/2001 | Geissler | |
| 6,331,694 B1 | 12/2001 | Blankenship | |
| 6,349,044 B1 | 2/2002 | Canales-Abarca | |
| 6,353,547 B1 | 3/2002 | Jang | |
| 6,365,874 B1 | 4/2002 | Stava | |
| 6,366,476 B1 | 4/2002 | Yasumura | |
| 6,384,373 B1 | 5/2002 | Schwartz | |
| 6,469,921 B2 | 10/2002 | Arai | |
| 6,472,634 B1 | 10/2002 | Houston et al. | |
| 6,483,687 B2 | 11/2002 | Katooka | |
| 6,501,049 B2 | 12/2002 | Stava | |
| 6,504,132 B1 | 1/2003 | Church | |
| 6,570,128 B1 | 5/2003 | Mela | |
| 6,570,129 B1 | 5/2003 | Samodell | |
| 6,570,130 B1 | 5/2003 | Kooken | |
| 6,570,132 B1 | 5/2003 | Brunner | |
| 6,600,134 B2 | 7/2003 | Stava | |
| 6,618,274 B2 | 9/2003 | Boylan | |
| 6,653,595 B2 | 11/2003 | Hutchison | |
| 6,660,966 B2 | 12/2003 | Houston | |
| 6,665,183 B1 | 12/2003 | Shikata | |
| 6,683,278 B2 | 1/2004 | Stava | |

(56) References Cited

U.S. PATENT DOCUMENTS

| | | |
|---|---|---|
| 6,710,299 B2 | 3/2004 | Blankenship |
| 6,713,721 B2 | 3/2004 | Albrecht |
| 6,717,107 B1 | 4/2004 | Hsu |
| 6,723,957 B2 | 4/2004 | Holverson |
| 6,750,637 B2 | 6/2004 | Nagaki et al. |
| 6,815,639 B2 | 11/2004 | Geissler |
| 6,864,479 B1 | 3/2005 | Davis et al. |
| 7,022,935 B1 | 4/2006 | Matus |
| 7,274,000 B2 | 9/2007 | Dodge et al. |
| 8,269,141 B2 | 9/2012 | Daniel et al. |
| 2002/0125235 A1* | 9/2002 | Stava ................ 219/130.33 |
| 2002/0191425 A1 | 12/2002 | Geissler |
| 2003/0111451 A1* | 6/2003 | Blankenship et al. ..... 219/130.5 |
| 2003/0183609 A1 | 10/2003 | Holverson et al. |
| 2004/0206736 A1 | 10/2004 | Nishikawa et al. |
| 2005/0051196 A1 | 3/2005 | Kao et al. |
| 2006/0011595 A1 | 1/2006 | Daniel et al. |
| 2006/0086706 A1 | 4/2006 | Ulrich |
| 2006/0175313 A1 | 8/2006 | Kooken et al. |
| 2006/0213890 A1 | 9/2006 | Kooken et al. |
| 2006/0226130 A1 | 10/2006 | Kooken et al. |
| 2006/0243716 A1 | 11/2006 | Stava et al. |
| 2007/0051712 A1 | 3/2007 | Kooken et al. |

FOREIGN PATENT DOCUMENTS

| | | |
|---|---|---|
| AU | 2006200513 C1 | 9/2008 |
| BR | PI 0505514 A | 3/2006 |
| BR | PI0505417-6 A | 12/2006 |
| CA | 2518125 A1 | 9/2006 |
| CA | 2527747 C | 4/2013 |
| CN | 1064178 A | 9/1992 |
| CN | 1324141 A | 11/2001 |
| CN | 1838517 A | 9/2006 |
| CN | 101168210 A | 4/2008 |
| CN | 100464922 C | 3/2009 |
| CN | 100537107 C | 9/2009 |
| CN | 101941111 A | 1/2011 |
| EP | 0670623 A3 | 9/1995 |
| EP | 0704957 B1 | 1/1999 |
| EP | 1 616 654 A1 | 1/2006 |
| EP | 1615654 A | 1/2006 |
| EP | 1 688 203 A2 | 8/2006 |
| EP | 1 704 854 A1 | 9/2006 |
| EP | 1 704 954 A1 | 9/2006 |
| EP | 1916047 A1 | 4/2008 |
| EP | 1710897 B1 | 8/2010 |
| EP | 1668203 B1 | 8/2011 |
| GB | 2320627 A | 6/1998 |
| JP | 45-35273 A | 11/1970 |
| JP | 58-112657 A | 7/1983 |
| JP | 58-132368 | 8/1983 |
| JP | 61-296965 | 12/1986 |
| JP | 1-143767 | 6/1989 |
| JP | 2-41777 A | 2/1990 |
| JP | 02041777 A | 2/1990 |
| JP | 3-4376 A | 1/1991 |
| JP | 4-105552 A | 4/1992 |
| JP | 4-303714 A | 10/1992 |
| JP | 8 308219 A | 11/1996 |
| JP | 09-271940 | 10/1997 |
| JP | 09-271940 A | 10/1997 |
| JP | 11123552 A | 5/1999 |
| JP | 11-235040 | 8/1999 |
| JP | 11-235040 A | 8/1999 |
| JP | 2000-173794 | 6/2000 |
| JP | 2006223092 A | 8/2006 |
| JP | 4762600 B2 | 8/2011 |
| KR | 10-2006-0090162 A | 8/2006 |
| KR | 10-0671379 B1 | 1/2007 |
| KR | 10-0675117 B1 | 1/2007 |
| KR | 100815659 B1 | 3/2008 |
| MX | PA06001461 A | 9/2006 |
| MX | 265521 B | 3/2009 |
| PL | 1688203 T3 | 1/2012 |
| TW | 1309912 B | 5/2009 |
| TW | 1314490 B | 9/2009 |
| TW | I320627 B | 2/2010 |
| WO | WO 03/015973 A | 2/2003 |

OTHER PUBLICATIONS

*The Incredible Shrinking (Unregulated) Power Supply* by Dr. Ray Ridley.
*Boost Power Factor Corrector Design with the UC3853*—Application Note U-159 by Phillip C. Todd—Unitrode Corporation—1999.
*Power Supply Cookbook* by Marty Brown—Copyright 1994 by Butterworth-Heinemann.
*Choose the Optimum Topology for High Power Factor Supplies*—by Bob Mammano and Lloyd Dixon—Unitrode IC Corporation PCIM Mar. 1991.
*High Power Factor Preregulators for Off-Line Power Supplies* by Lloyd H. Dixon, Jr.
*The LT1248 Power-Factor Corrector* by Cark Nelson—Linear Technology Magazine—Jun. 1993.
*High Power Factor Preregulator*—Unitrode.
*Properties and Synthesis of Passive, Lossless Soft-Switching PWM Converters*—International Congress of Israel in Energy Power & Motion Control—May 1997.
EP Search Report, EP 05 02 5646, Jan. 23, 2008, Enguerran Despis.
EP Search Report, EP 05 02 5646, Jan. 23, 2008.
EP Communication, 06 000 268.0-2302, Jan. 9, 2008.
European Search Report, EP 07 10 3523, Munnich, Jan. 30, 2008, Jeggy, Thierry.
European Search Report, EP 05 005216, Feb. 9, 1990.
Ned Mohan, Tore M. Undeland, and Ralph J. Ferraro, "Sinusoidal Line Current Rectification with a 100kHz B-Sit Step-Up Converter", 1994.
Lloyd H. Dixon, Jr., "High Power Factor Preregulators for Off-Line Power Supplies", Unitrode Corporation.
Carl Nelson, "The LT1248 Power-Factor Corrector", Linear Technology Magazine, Jun. 1993.
Fred C. Lee, Wojciech A. Tabisz and Milan M. Jovanovic, "Recent Developments in High-Frequency Quasi-Resonant and Multi-Resonant Converter Technologies", EPE Aachen, 1989.
Kwang-Hwa Liu and Fred C. Lee, "Zero-Voltage Switching Technique in DC/DC Converters", 1986 IEEE.
Wojciech A, Tabisz, Pawel M. Gradzki, and Fred C.Y. Lee, "Zero-Voltage-Switched Quasi-Resonant Buck and Flyback Converters—Experimental Results at 10 MHz", IEEE Transactions on Power Electronics, vol. 4, No. 2, 1989.
Jung-Goo Cho, Ju-Won Baek, Geun-Hie Rim, and Iouri Kang, "Novel Zero-Voltage-Transition PWM Multiphase Converters", IEEE Transactions on Power Electronics, vol. 13, No. 1, Jan. 1998.
Wenkang Huang, George Schuellein, and Danny Clavette, "A Scalable Multiphase Buck Converter with Average Current Share Bus", International Rectifier, pp. 1-7.
George Schuellein, "Multiphase Converter Bucks Power", EE Times.
Jen Czogalla, Jieli Li, and Charles R. Sullivan, "Automotive Application of Multi-Phase Coupled-Inductor DC-DC Converter", IAS 2003.
Pit-Leong Wong, Peng Xu, Bo Yang, and Fred C. Lee, "Performance Improvements of Interleaving VRM's with Coupling Inductors", IEEE Transactions on Power Electronics, vol. 16, No. 4, Jul. 2001.
P. Zumel, O. Garcia, J.A. Cobos and J. Uceda, Magnetic Integration for Interleaved Converters, 2003 IEEE, pp. 1143-1149.
Lloyd Dixon, "Coupled Filter Inductors in Multi-output Buck Regulators".
D.J. Shortt, W.T. Michael, R.L. Avant, R.E. Palma, "A 600 Watt Four Stage Phase-Shifted-Parallel Dc-Dc Converter", pp. 136143.
Chun Cheung, Ross O. Staffhorst, "ISL6558EVAL1-Multi-Phase Power Conversion for Routers and PC Peripherals Up to 100A", pp. 1-24.

(56) References Cited

OTHER PUBLICATIONS

Wang Li-Qiano, Li Jian-Lin, Zhang Zhong-Chao, "Carrier Phase Shifted SPWM Based on Current Sourced Multi-Modular Converter fro Active Power Filter", Journal of Zhejiang University SCIENCE.
Milan M. Jovanovic, Wojciech A Tabisz, and Fred C. Lee, "Zero-Voltage-Switching Technique in High-Frequency Off-Line Converters".
Wojciech A Tabisz and Fred C. Lee, "Zero-Voltage-Switching Multi-Resonant Technique—A Novel Approach to Improve Performance of High-Frequency Quasi-Resonant Converters".
J.A. Sabate, V. Vlatkovic, R.B. Ridley, F.C. Lee and B.H. Cho, "Design Considerations for High-Voltage High-Power Full-Bridge Zero-Voltage-Switched PWM Converter".
Z.D. Fang, D.Y.Chen, F.C. Lee, "Designing a High Effeciency Fet Inverter Module for Vector Summation Switching High Power Amplifier".
Guichao Hua, Fred C. Lee, and Milan M. Jovanovic, "An Improved Zero-Voltage-Switched PWM Converter Using a Saturable Inductor", PESC Jun. 1991.
Vatche Vorperian, "Quasi-Square-Wave Converters: Topologies and Analysis", IEEE Transactions on Power Electronics, vol. 3, No. 2, Apr. 1988.
Guichao Hua and Fred C. Lee, "A New Class of Zero-Voltage-Switched PWM Converters", HFPC Jun. 1991.
Robert Streit and Daniel Tollik, "High Efficiency Telecom Rectifier Using a Novel Soft-Switched Boost-Based Input Current Shaper", 1991 IEEE.
Hacy Bodur and A. Faruk Bakan, "A New ZVT-PWM DC-DC Converter", IEEE Transactions on Power Electronics, vol. 17, No. 1, Jan. 2002.
Hacy Bodur and A. Faruk Bakan, "a New ZVT-ZCT-PWM Dc-Dc Converter", IEEE Transactions on Power Electronics, vol. 19, No. 3, May 2004.
Laszlo Balogh, Chris Bridge, and Bill Andreycak, "Unique Cascaded Power Converter Topology for High Current Low Output Voltage Applications".
Chinese Office Action, Publication No. 2005100840791, the examiner Jiangping Ding.
1995 paper with translated abstract, "Study on Multi-Function Arc Welding Dual Inverter".
Japanese Office Action, Patent Application No. 2006-030436, dated Apr. 9, 2008.
Japanese Office Action, Patent Application No. 2005-314067, dated Apr. 9, 2008.
Mantaro Nakamura, "A Chopper Type DC/DC Converter", Application No. 7-283959, filed Oct. 31, 1995.
Japanese Office Action, Patent Application No. 2006-015765, dated Apr. 9, 2008.
Haruo Moriguchi, "An Arc Welding Machine", Application No. 56-212074, filed Dec. 25, 1981.
Masahiko Akamatsu, "DC Power Control Apparatus", Application No. 41-80885, filed Dec. 10, 1996.
Koichi Makinose et al., "DC/DC Converter", Application No. 2-223521, filed Aug. 24, 1990.
European Search Report, EP 06 00 0263, Munich, May 30, 2006, Jeggy T.
European Search Report, EP 06 00 0268.
Japanese Office Action, Patent Application No. 2005-134928, dated Jun. 19, 2008.
The Notification of the First Office Action, dated Jun. 13, 2008.
Canadian Office Action, dated Nov. 6, 2008.
Office Action of the IPO, dated Sep. 18, 2008.
The Notification of the First Office Action, dated Aug. 8, 2008.
Notice of the Final Rejection, dated Oct. 7, 2008, Patent Application No. 2005-314067.
Notice of Final Rejection, dated Oct. 7, 2008, Patent Application No. 2006-015765.
Decision on Appeal Trial (Feb. 23, 2010) with English Translation & Englsih Translation of claims on appeal for Corresponding Japanese Application No. 2006-15765.
Office Action (dated May 14, 2010); U.S. Appl. No. 11/102,429, filed Apr. 8, 2005.
Office Action (dated Nov. 10, 2009); U.S. Appl. No. 10/889,866, filed Jul. 13, 2004.
Office Action (dated Mar. 23, 2010); U.S. Appl. No. 11/551,957, filed Oct. 23, 2006.
Office Action (dated Apr. 2, 2010); U.S. Appl. No. 11/087,179, filed Mar. 24, 2005.
Official Communication (dated Nov. 13, 2009); EP Application No. 05005216.6; filed Mar. 10, 2005.
AU Application No. 2005202559: Office Action dated Nov. 1, 2006.
CN Application No. 2005100840791: Notification of the Second Office Action dated Aug. 8, 2008 & English translation (Note: Reference 1 is the Ding article).
EP Application No. 05 005216.6: EPO Communication dated Feb. 13, 2007.
EP Application No. 05 025646.0: EPO Communication dated Dec. 16, 2008.
JP Application No. 2005-134928: Notification of Reasons for Refusal dated Jan. 6, 2009.
JP Application No. 2005-134928: Interrogation on Appeal dated Apr. 27, 2010 Appeal, Claims on Appeal and English translation of same.
TW Application No. 094141622: Office Action of the IPO dated Sep. 23, 2008.
Covi, "A Combined Buck and Boost Converter for Single—Phase Power Factor Correction", 2005 IBM Power and Cooling Technology Symposium, Oct. 7, 2005.
Jiang and Lee, "A New Control Scheme for Buck+Boost Power Factor Correction Circuit", Proceedings of the Virginia Power Electronics Seminar, Sep. 19-21, 1993; pp. 189-193.
Ridley, Kern and Fuld, "Analysis and Design of a Wide Input Range Power Factor Correction Circuit for Three-Phase Applications", IEEE, 1993, pp. 299-305.
U.S. Appl. No. 11/102,429: Amendment Response After Non-Final (dated Sep. 9, 2010) and Non-Final Rejection (dated May 14, 2010).
U.S. Appl. No. 10/889,866: Amendment Submission with RCE (dated Jul. 12, 2010) and Final Rejection (dated Nov. 11, 2010).
U.S. Appl. No. 11/551,957: Amendment Response After Non-Final (dated Aug. 23, 2010) and Non-Final Rejection (dated Mar. 23, 2010).
U.S. Appl. No. 11/087,179: Amendment Response After Non-Final (dated Jul. 30, 2010) and Non-Final Rejection (dated Apr. 2, 2010).
U.S. Appl. No. 13/572,354.
U.S. Appl. No. 11/087,179.
U.S. Appl. No. 11/102,429.
U.S. Appl. No. 11/551,957.
U.S. Appl. No. 10/889,886.
Ammendment Response, Remarks in U.S. Appl. No. 10/889,866 at pp. 34-37 (dated Mar. 21, 2012).
Non-Final Office Action in U.S. Appl. No. 13/572,354 (dated Jun. 17, 2013).
Final Office Action in 11/102,429 (dated Aug. 22, 2013).
Patent Abstracts of Japan, EP 05 00 5216, The Hague, Oct. 21, 2005, Herbreteau, D. vol. 0142, No. 03 (M-966), Apr. 25, 1990 & JP 02 041777 A (Daihen Corp.), Feb. 9, 1990.
U.S. Appl. No. 13/572,354; Final Office Action dated Nov. 18, 2013; See pp. 2-3, paragraph 5.
Japanese Patent Application No. 2005-134928, Documents related to Appeal Interrogation, 37 pages, Estimated Apr. 2010.
Canadian Patent Application No. 2497813, Office Action, 3 pages, dated Nov. 21, 2011.
Canadian Patent Application No. 2518125, Office Action, 3 pages, dated Jul. 11, 2012.
Canadian Patent Application No. 2518125, Office Action, 4 pages, dated Mar. 10, 2011.
Canadian Patent Application No. 2526523, Office Action, 4 pages, dated Aug. 5, 2009.
Canadian Patent Application No. 2580041, Office Action, 2 pages, dated Sep. 9, 2011.

(56) References Cited

OTHER PUBLICATIONS

Canadian Patent Application No. 2580041, Office Action, 5 pages, dated Jul. 2, 2010.
Chinese Patent Application No. 200510115823X, Office Action, 13 pages, dated Jun. 13, 2008.
Chinese Patent Application No. 2006100014885, Office Action, 10 pages, dated Aug. 8, 2008.
European Patent Application No. 11005096.0, Extended European Search Report, 7 pages, dated Oct. 27, 2011.
Japanese Patent Application No. 2005-134928, Appeal Decision, 4 pages, dated May 10, 2011.
Japanese Patent Application No. 2005-134928, Appeal Interrogation, 6 pages, dated Apr. 27, 2010.
Japanese Patent Application No. 2005-134928, Appeal Office Action, 5 pages, dated Oct. 5, 2010.
Japanese Patent Application No. 2006-15765, Appeal Decision, 49 pages, dated Feb. 23, 2010.
Japanese Patent Application No. 2006-15765, Final Office Action, 4 pages, dated Oct. 7, 2008.
Mammano, Bob et al., "Choose the Optimum Topology for High Power Factor Supplies," PCIM, 9 pages, Mar. 1991.
Smith Jr., K. Mark et al., "Properties and Synthesis of Passive, Lossless Soft-Switching PWM Converters," 1st International Congress in Israel on Energy Power & Motion Control, EPMC '97, 8 pages, Sep. 1999.
Smith Jr., K. Mark et al., "Properties and Synthesis of Passive, Lossless Soft-Switching PWM Converters," 1st Taiwanese Patent Application No. 094142806, Office Action, 4 pages, Sep. 18, 2008.
Todd, Phillip C., "Boost Power Factor Corrector Design With The UC3853," Unitrode Corporation, 24 pages, estimated Jan. 1999.

\* cited by examiner

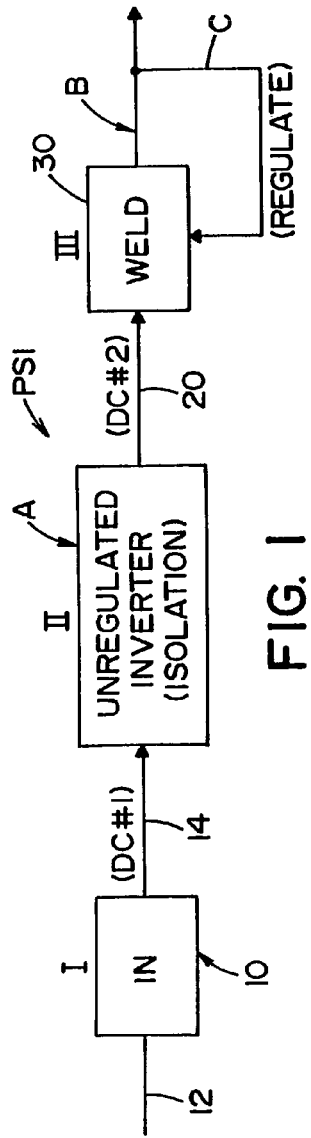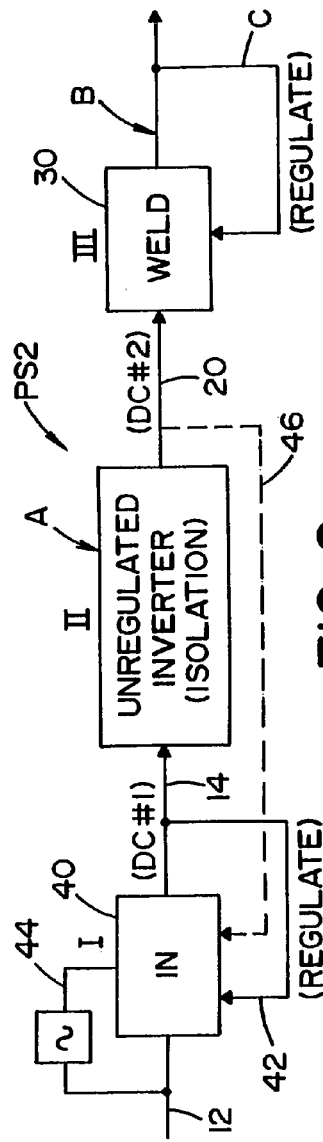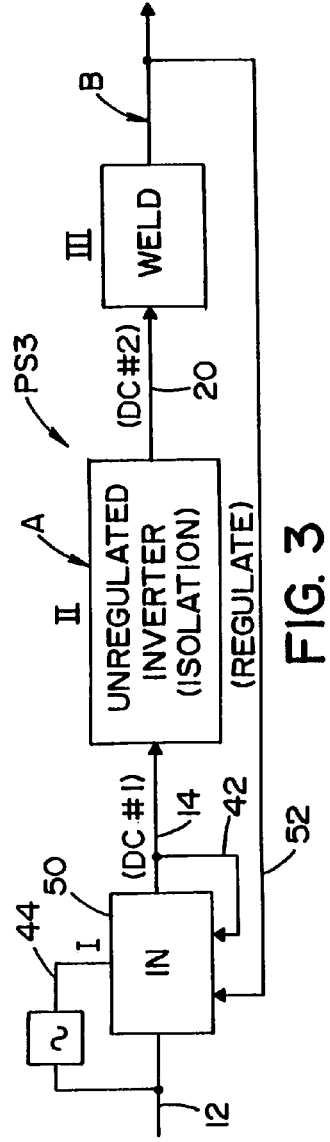

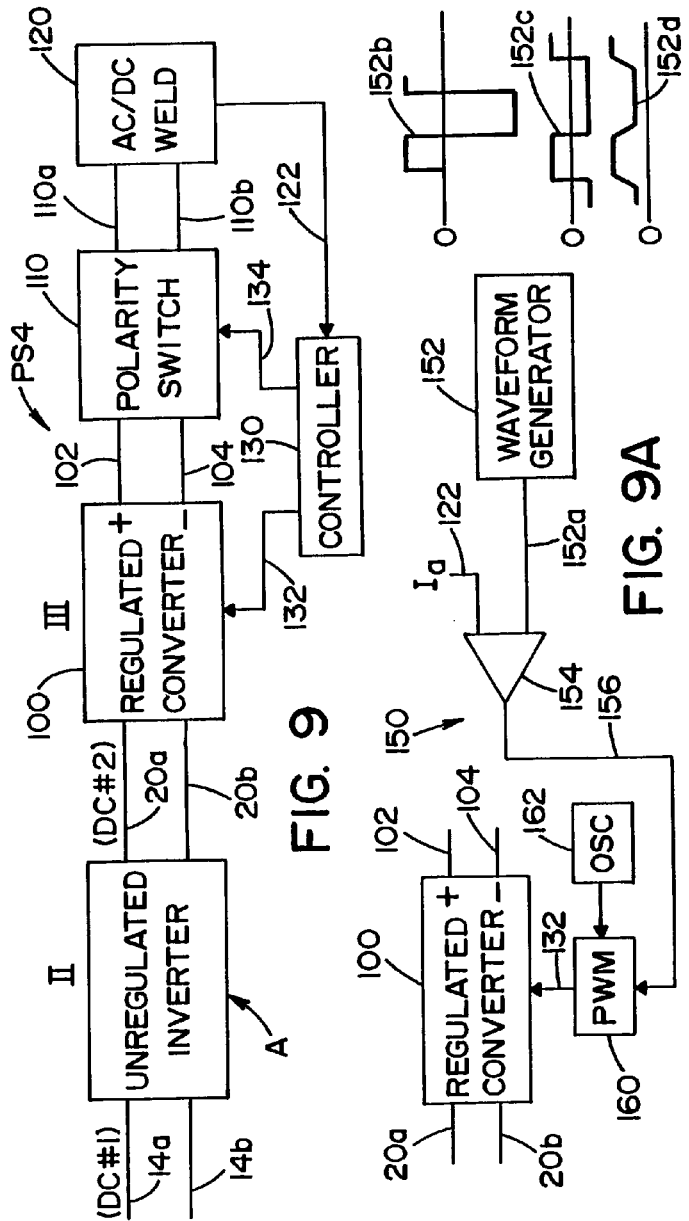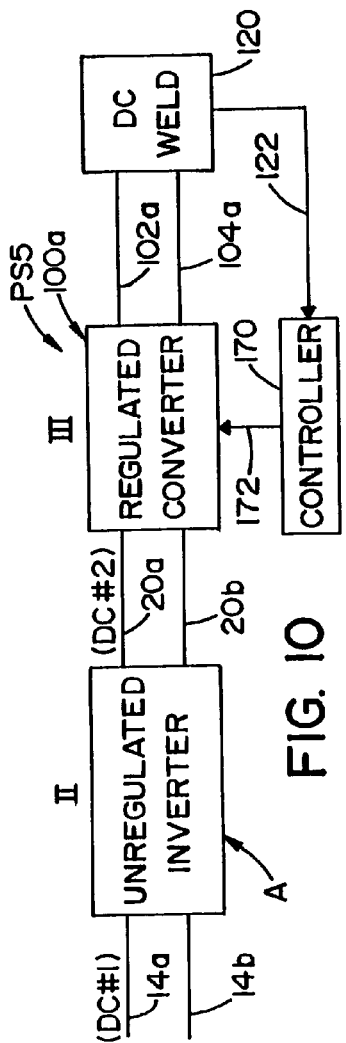

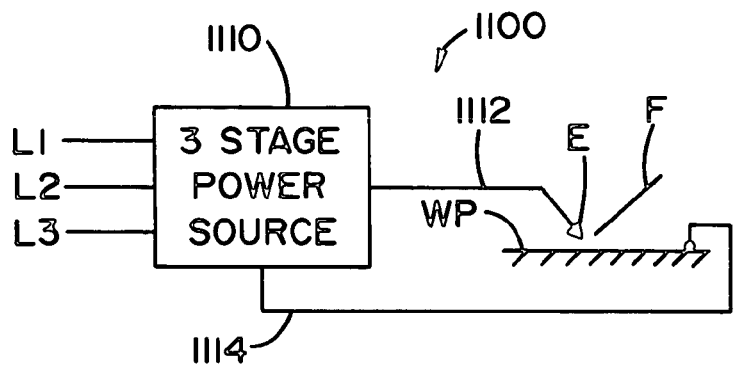
FIG. 33
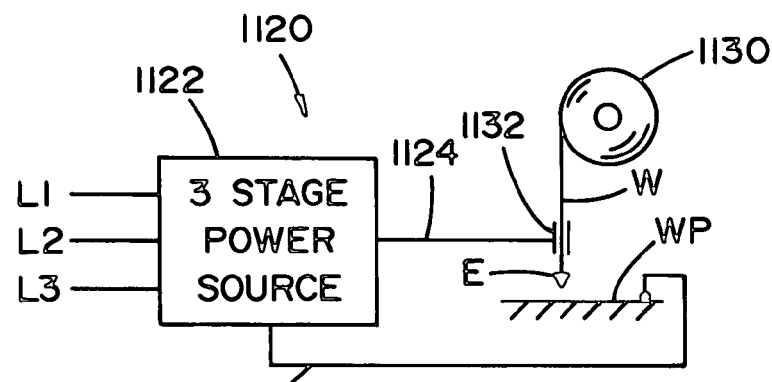
FIG. 34
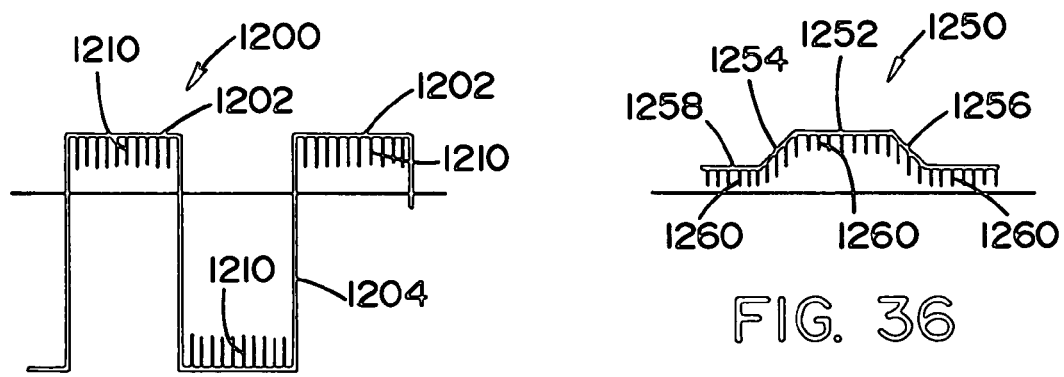
FIG. 35
FIG. 36

MODULAR POWER SOURCE FOR ELECTRIC ARC WELDING AND OUTPUT CHOPPER

The invention relates to the field of electric arc welding and more particularly to a modular power source for such welding and a novel dual mode chopper output stage for a welder.

INCORPORATION BY REFERENCE AND BACKGROUND OF INVENTION

Electric arc welding involves the passing of an AC or DC current between a metal electrode and a workpiece where the metal electrode is normally a cored metal wire or solid metal wire. A power source is used to create a given current pattern and/or polarity between the advancing electrode wire and workpiece so that the arc will melt the end of the advancing welding wire and deposit the molten metal on the workpiece. Although various converter technologies are used for power sources, the most effective is an inverter based power source where a switching network includes switches operated at high frequency to create the desired waveform or current level for the welding process. An inverter type power source is discussed in Blankenship U.S. Pat. No. 5,278,390 where the inverter is operated in accordance with the preferred embodiment of the present invention. This preferred operating procedure involves "waveform control technology" pioneered by The Lincoln Electric Company of Cleveland, Ohio where the actual waveform is generated by a series of short pulses created at a frequency generally above 18 kHz and the group of short pulses has a profile controlled by a waveform generator. This well known type of inverter control technique is used in the preferred embodiment of the present invention and need not be described in more detail. In accordance with standard power source technology, the input signal to the inverter stage of the power source is rectified current from a sine wave power supply. An appropriate power factor correcting converter is common practice and is either a part of the inverter switching network itself, as shown in Kooken U.S. Pat. No. 5,991,169, or is located before the inverter stage, as shown in Church U.S. Pat. No. 6,177,645. Indeed, a power source with a power factor correcting converter or stage has been known in the welding art for many years. Another power source employing an input power factor correcting converter in the form of a boost converter is shown in Church U.S. Pat. No. 6,504,132. The two patents by Church and the patent by Kooken are incorporated by reference herein as background information and technology to which the present invention relates. In both Kooken U.S. Pat. No. 5,991,169 and Church U.S. Pat. No. 6,504,132 the actual welding current is regulated by an output chopper or buck converter and isolation is obtained by a transformer either in the output of the inverter stage or in the output of the input boost converter. These various topologies for power sources are common knowledge in arc welding technology. In these prior art patents, the actual welding current, voltage or power is regulated in or before the output stage of the power source, which output stage is either an inverter or a chopper. Neither the inverter, nor the chopper is unregulated to produce a fixed, lower voltage DC bus for driving a regulated welding stage as anticipated by the present invention.

Isolation of the welding operation is a characteristic of most power supplies for welding. The term "welding" includes "plasma cutting." In Vogel U.S. Pat. No. 5,991,180, a preregulator using a boost converter is directed to a converter which is disclosed as a chopper having an output isolation transformer located after welding regulation and directly driving the welding operation. In this power source, the chopper network is controlled to create the desired regulated output welding current and isolation is provided in the output stage. In a like manner, Thommes U.S. Pat. No. 5,601,741 discloses a boost converter for driving a pulse width modulated controlled inverter providing the regulated output signal to the actual welding operation. In both Vogel and Thommes, the second stage is regulated to direct the power factor controlled current from a preregulator into a welding operation. Welding regulation is in the second stage and is normally driven by a pulse width modulator control circuit. Both Vogel and Thommes are incorporated by reference herein as background technology. In Moriguchi U.S. Pat. No. 6,278,080 an inverter type power source is regulated to control the desired welding current. Isolation is obtained by a transformer between the controlled second stage inverter and the welding output which is disclosed as a DC welding operation. A similar power source is shown in Moriguchi U.S. Pat. No. 5,926,381 and Moriguchi U.S. Pat. No. 6,069,811 wherein the isolation of the control current from the inverter stage is at the output of the inverter and directly drives the welding operation. Moriguchi U.S. Pat. No. 5,926,381 discloses the common arrangement for using the voltage at the output of the first stage boost converter to provide the controller voltage for either the regulated inverter stage or the boost converter itself. The three Moriguchi patents are incorporated by reference herein as background information showing the prior art power source where a regulated inverter is driven by an input boost converter or a DC output of a rectifier to produce a controlled welding current directed to an output transformer used for isolation. The secondary AC signal of the isolation transformer is directly used for the welding operation. There is no third stage topology as used in the novel power source of the invention.

Turning now to non-welding technology, an aspect of the invention is the use of a synchronous rectifier device at the output of a DC/DC second stage converter. Synchronous rectifiers are common practice and one such rectifier is illustrated in Boylan U.S. Pat. No. 6,618,274. Calkin U.S. Pat. No. 3,737,755, discloses a DC/DC converter for low power use where a fixed regulated current is directed to a non-regulated inverter to provide a non variable output DC signal. Any control of the non-regulated inverter is at the input side of the inverter so that the input DC signal is the only parameter that can be regulated to control the fixed output DC signal of the inverter. This is a topography that requires a control of the signal to the inverter so that the inverter provides a controlled fixed output signal. This is a different concept than anticipated by use of the present invention; however, the non-welding general background technology in Boylan and Calkin is incorporated by reference herein to show a synchronous rectifier and a version of a non-regulated inverter where any regulation is performed before the inverter by controlling the level of the input DC signal. Neither of these patents relate to a power source for welding and are only incorporated by reference as general technical concepts, such as synchronous rectifier devices and unregulated inverters. A non-welding two stage AC to DC converter is shown in Smolenski U.S. Pat. No. 5,019,952 for imparting minimum harmonic distortion to the current flowing into the converter. The load is not variable and does not require regulation as demanded in a welding operation. This patent is incorporated by reference to show general technology not related in any way to the demands of a power source for electric arc welding.

These patents constitute the background of the invention relating to a power source that must be regulated by a welding operation where such regulation is by a feedback loop of average current, average voltage, and power of the actual welding operation. Fixed load power sources are not relevant to the invention, except as general technical information.

In the past, an inverter in a power source outputted a welding current regulated by a parameter in the welding operation, such as current, voltage or power. This inverter was normally controlled by a pulse width modulator wherein the duty cycle of the switches operated at high frequency was controlled by the feedback from the welding operation so that the duty cycle was adjusted in a range substantially less than 100%. This type of PWM controlled inverter is referred to as a regulated single stage inverter. Such inverter formed the output of the power source and was the last stage of the power source. Lower duty cycles resulted in higher primary currents and more losses. The efficiency of the inverter varied according to the duty cycle adjustment caused by the requirement of regulating the output of the single stage inverter to create an output signal suitable for welding. Using a power source where the final stage is a regulated single stage inverter resulted in heat losses, lower efficiency, high cost and increased component size. For these reasons, some welding source manufacturers have marketed power sources as being better than an inverter power source because they do not use inverters with the resulting high cost and other difficulties. An inverter stage which had the dual function of isolating the output and regulating the current for the purposes of creating a current suitable for welding was to be avoided. See Hoverson U.S. Pat. No. 6,723,957 and Canales-Abarca U.S. Pat. No. 6,349,044, incorporated by reference herein as background.

The Three Stage Power Source Used in the Present Invention

The present invention is used with a power source for electric arc welding (plasma cutting) wherein the inverter of the power source is a second stage as in the past, but is unregulated so that a third stage can be added to provide the actual regulation for creating a current suitable for welding. By using this three stage concept, the inverter can operate at a very high frequency of switching whereas the output third stage can be a chopper operated at a lower frequency of switching. Consequently, the switching frequency is optimized by the function performed by the stage as opposed to the need for using high frequency in a pulse width modulated inverter stage used for actual regulation of the output welding current. Furthermore, the isolated, fixed DC voltage to the regulated third stage can be substantially lower than the DC voltage from the input converter stage and much higher than the actual welding output voltage.

The three stage power source using the invention involves a novel topography for a power source wherein the pulse width modulated inverter is merely a second stage for creating an isolated fixed output DC bus without a feedback signal to the second stage pulse width modulated inverter. This isolated bus is used in a third stage regulated by the actual welding parameters to create a current suitable for welding. Consequently, the invention involves an unregulated second stage not only providing necessary isolation but also to producing a fixed DC output bus to be used by a third stage wherein welding regulation is accomplished. The unregulated second stage inverter is operated at a very high frequency with a duty cycle that is fixed during operation of the power source. The frequency is over 18 kHz and preferably about 100 kHz. The duty cycle is fixed at various levels; however, the preferred duty cycle is close to 100% to give the maximum efficiency level obtained by use of the present invention. The use of a fixed, high duty cycle minimizes the current circulation time of the phase shift modulator controlled inverter second stage to substantially reduce heat an increase efficiency. The output of the second unregulated inverter stage is a rectifier which can use well known synchronous rectifier devices, which devices are controlled by the secondary winding of the internal isolation transformer of the second stage unregulated inverter. By using synchronous rectifier devices at the output of the second stage, there is further improvement in the total efficiency of the power source. By using the present invention, the first stage is either an input rectifier or an input rectifier with a power factor correcting converter. A first stage power factor correcting converter is preferred. This converter is after a standard rectifier or can be combined with the rectifier. Of course, this converter can be a passive power factor correcting converter or an active converter such as a boost, buck or buck+boost converter. The first stage of the invention produces a first DC bus with a fixed voltage. By using a standard first stage for the power source, the first DC output signal which is the input DC bus to the unregulated inverter can be regulated and fixed at a value of about 400-900 volts DC. The output of the unregulated, isolation inverter forming the second stage of the novel power source is a fixed DC bus having a fixed relationship with the input DC bus from the first stage. The voltage of the second DC bus or output is substantially less than the voltage of the DC bus from the first stage. The power source thus produces a second DC bus which has a fixed mathematical relationship with the input DC bus from the power factor correcting converter. In accordance with standard practice, the second stage unregulated inverter includes an isolation transformer having a primary winding and a secondary winding so that the secondary winding is isolated from the input of the power source. See Steigerwald U.S. Pat. No. 4,864,479, incorporated by reference herein. The unregulated, second stage inverter can be operated at a switching frequency to optimize the operation of the second stage inverter. Thus, extremely high switching frequency is used to reduce the size and cost of the components in the novel, unregulated second stage inverter. By utilizing a fixed duty cycle with phase shift control, voltage and current surges in the switching devices are reduced to provide a soft switching operation. Indeed, in the preferred embodiment, the duty cycle is fixed at 100% so that the switches are full on or full off. This drastically reduces the circulated current in the second stage and greatly improves the operating characteristics of the second stage inverter which also provides the function of isolating the welding output of the power source from the AC input of the power source. By having the switching devices in the second stage unregulated inverter operated at full on, this inverter has a high efficiency and is very flexible in operation. An isolation transformer determines the relationship between the fixed DC bus at the input side of the unregulated second stage (a "first DC output signal" from the first stage) and the DC output bus at the output of this second stage (a "second DC output signal"). In some prior art power sources, the duty cycle at the primary winding of the isolation transformer in the regulated inverter is regulated by the welding operation. There is no regulation by the welding operation in either the first stage or second stage of the novel power source used in the present invention.

Since the second unregulated inverter stage of the power source provides system isolation, many types of non-isolated converters can be used as the power factor correcting preregulator. A boost converter is the most popular converter due to the current shaping function and the continuous line current characteristics of this type of conversion. However, the output voltage of the boost converter is higher than the peak of the highest line voltage, which peak can be as high as 775 volts. Thus, other active power factor correcting regulators can be used with the invention, which is a three stage power source wherein the second stage is unregulated and provides isolation. One of the other options for the active power factor correcting input or first stage is a step-up/step-down converter so that the primary voltage bus or input bus to the second stage can be lower than the peak of the input AC voltage signal to the power source. This type of power factor correcting converter still produces low harmonics. One such power factor converter is referred to as a buck+boost converter. A 400 volt to 500 volt DC bus used for the second stage is obtained with an input AC voltage in the range of 115 volts to 575 volts. Irrespective of the AC voltage to the first stage, the output voltage of the active power factor converter is controlled to be at a level between 400 volts and 500 volts. Other types of active and passive power factor correcting inverters can be used in the invention. The preferred converter is active thus constituting a second switching network requiring a second control circuit. When using the term electric arc welding, it also includes other output processes, such as plasma cutting.

As so far explained, the power source using the invention involves a three stage power source for electric arc welding. A feedback control in the third stage creates an output current suitable for welding. The input first stage is normally an active power factor correcting converter requiring a second switching network and a second independent control circuit. This three stage topography is not used in the prior art. By having this topography, the added second stage is merely used to convert the high voltage DC bus at the primary side of the second stage to a lower voltage DC bus at the secondary side of the second stage isolated from the primary side. Thus, the power source involves a DC bus at the secondary side of the second stage so that the bus can be used for regulation of welding power. The term "bus" means a DC signal that has a controlled fixed level. In the present invention, there is a first DC bus from the input stage called the "first DC output" which first DC output has a controlled DC voltage. There is a second DC bus at the secondary side of the second stage called the "second DC output" which second DC output is also a controlled DC voltage level. The creation of a second DC bus at the secondary side of an unregulated inverter has advantages, other than the advantages associated with the use of the unregulated second stage inverter as so far described. The secondary DC bus or second DC output is isolated from the primary side of the second stage so that there is no isolation required in the third stage welding control circuit. In other words, the output control circuit, such as a chopper, has an input DC bus with a fixed voltage level. In practice, the chopper has a controller with a control voltage that is derived from the input DC to the chopper. This input DC signal is isolated from the input power. Consequently, the control voltage for the controller of the output stage or chopper can be derived from a non-isolated DC source. This is normally the input signal to the chopper. Separate isolation of the control voltage for the controller used in the output stage is not required. The use of a fixed DC bus from the second stage allows the DC voltage to the output third stage, which is regulated by the welding operation, to be much lower than the normal input primary DC bus ("first DC output") of the power source. In the past, the output of the power factor converter is a relatively high level DC signal based upon the use of a boost converter. This high DC voltage was directed to the regulated inverter stage for use in outputting a current suitable for the welding. By using the present invention the high voltage from the output bus of the power factor converter is drastically reduced. It is more efficient to convert a 100 volt DC bus into a 15 volt control power than to convert a 400 volt DC bus to a 15 volt control power. This creation of a second, lower voltage DC bus is a substantial advantage of the three stage power source of the present invention.

The Invention

In accordance with the present invention there is provided a power source for an electric arc welding process wherein the power source comprises an input stage having an AC input and a first DC output signal. A second stage in the form of an unregulated DC to DC converter has an input connected to the first DC output signal and an output in the form of a second DC output signal electrically isolated from the first DC output signal with a magnitude of a given ratio to the first DC output signal. The power source includes a third stage to convert the second DC output signal to a welding current for the welding process. In accordance with another aspect of the present invention there is provided a power factor correcting converter as the first stage of the novel three stage power source. The third stage of the power source includes a regulated converter such as a chopper or inverter. When using an inverter, the output is a DC signal directed to a polarity network or switch, which switch allows DC welding by the power source. The polarity switch allows welding either DC negative, DC positive or AC. The welding process, using either a chopper or an inverter, can be performed with shielding gas, such as MIG welding, and can use any type of electrode, such as tungsten, cored wire or solid metal wire. In accordance with an aspect of the invention, the output of the unregulated DC to DC converter is substantially less than the input to the second stage. In most instances, the input and output of the second stage are DC voltages with generally fixed magnitudes. The input stage and the second stage are assembled on a first module and the third stage is a second module. This is novel. The three stages are not on a common building block. There are two power modules. The output module is preferably a chopper. However, the output stage can be changed between a DC, AC or STT circuit. The two stage input module can be paralleled to drive a high power chopper module. The advantage of such paralleling capability is explained in Stava U.S. Pat. No. 6,291,798, incorporated by reference herein.

In accordance with an aspect of the invention, the power switches of the third stage of the modularized three stage power source has a commonly used soft switching circuit of the passive type, as described in a May 1997 article by the University of California entitled Properties and Synthesis of Passive, Loseless Soft Switching PWM Converters, incorporated by reference herein. The same passive switching circuit is disclosed in Geissler U.S. Pat. No. 6,115,273 and Chen U.S. Pat. No. 5,874,826, incorporated by reference herein. See also Vogel U.S. Pat. No. 5,991,180 and Bhagwat U.S. Pat. No. 5,636,114, incorporated by reference herein.

The present invention relates to modularizing a novel three stage power source, so all three stages are not assembled onto a common base. In accordance with the invention, the first two stages are in a single module. Consequently, the input module contains the power factor correcting stage, or preregulator, and the isolation stage which second stage is an unregulated inverter operated at a fixed duty cycle by a pulse width modulator; the pulse width modulator is controlled by waveform technology using a wave shaper or waveform generator. Thus, the power factor stage and isolation stage are commonly mounted and can be used with any output stage having its own support structure. Preferably the output stage is a chopper. Use of two building blocks, instead of a single platform for the power source, allows changing of the output or chopper stage to change between various welding processes, such as DC positive, DC negative, AC or STT. By modularizing the first two stages of the novel three stage power source for welding, the modularized first stage can be paralleled to provide a higher input to drive an existing high power chopper module. This use of a first module with the first two stages and a second module with the third stage is a substantial improvement in the novel three stage welding power source to which the invention is directed. In accordance with another aspect of the invention, the chopper is provided with a somewhat common soft switching circuit so that the power switch of the chopper is soft switched both in current and in voltage. The soft switching network for the output stage is a further improvement permitted by the modularized concept.

In accordance with another aspect of the invention, the chopper is a dual mode chopper having a first power switch with a first polarity switch to produce a first polarity path in the output of the chopper. A second polarity path is formed by a second power switch and a companion polarity switch to create an opposite polarity current flow. This type of dual mode chopper constitutes a novel output stage for an electric arc welder. Consequently, the chopper design forms an aspect of the invention separate from the modularized three stage topography disclosed above.

In accordance with the present invention there is provided an output stage for a power source of an electric arc welder. This output stage is a chopper with a first polarity path having a first power switch and a polarity switch and a second polarity path having a second power switch and a polarity switch. Furthermore, this output stage includes a controller with a first mode for alternately operating the chopper between the first and second paths and a second mode operating the chopper in only one of the two polarity paths. In this manner, the single chopper output stage can be operated in DC positive, DC negative or AC by merely controlling the switching signals of the power switches and auxiliary polarity switches. This is a novel output stage for a power source used in welding and is used in a three stage power source with the first and second stages being in a single module and the third stage or chopper being in a separate and replaceable second module.

In accordance with an overall aspect of the present invention, the novel three stage power source with a center unregulated DC to DC converter is used in combination with a series of different types of welding processes such as submerged arc welding, tandem electrode welding using two three stage power sources, TIG welding and standard MIG welding. The welding processes combined with the novel three stage power source utilizes an output signal which is either DC or AC. The DC signal is a fixed voltage, fixed current signal or a pulsed signal having a specific shape determined by the use of waveform technology as pioneered by The Lincoln Electric Company of Cleveland, Ohio. The DC welding signal is either positive or negative. The AC welding signal is created by waveform technology as disclosed in many patents including Blankenship U.S. Pat. No. 5,278,390 and Stava U.S. Pat. No. 6,683,278, incorporated by reference herein. This technology involves a waveform generator or wave shaper used to control a pulse width modulator for determining the output waveform when either a DC or AC output welding signal is used in the welding process. The AC signal can have a larger energy or magnitude in either polarity. Furthermore, the electrode used in the submerged arc process and the MIG process is normally a flux cored electrode even through a solid wire electrode or alloy cored electrode can be used. The same welding processes using the novel three stage power source are performed by a welding power source having an output stage in the form of a dual mode chopper. Such chopper is unique in the welding industry and is disclosed and claimed herein. The dual mode chopper is driven by a DC input signal to produce an output welding signal, which is either DC or AC. Preferably, the DC input signal is created by a two stage input circuit having an unregulated isolation DC to DC converter just prior to the dual mode chopper. These and other combinations of the novel three stage power source and the novel dual mode chopper combined with various output welding processes is an overall aspect of the present invention.

The primary object of the present invention is the provision of a three stage power source for electric arc welding, which stages are modularized so that the first two stages are a single module and the second or output stage is a separate replaceable module.

Another object of the present invention is the provision of a three stage power source, as defined above, which power source utilizes a modularized first and second stage, which first module can be connected in parallel to drive a single output module.

Still a further object of the present invention is the provision of a three stage power source, as defined above, which three stage power source has an output module wherein the power switch of the output stage has a soft switching circuit. The soft switching circuit is passive and controls both the switching voltage and the switching current.

Yet another object of the present invention is the provision of a three stage power source, as defined above, which power source has a novel output chopper module that can be operated in DC positive, DC negative or AC to control the output welding operation for MIG welding, TIG welding, tandem welding and submerged arc welding.

Another object of the present invention is the provision of a novel dual mode chopper for the output stage of a power source used in an electric arc welding, which output stage can be shifted between DC−, DC+ or AC to control the welding operation for MIG welding, TIG welding, tandem welding and submerged arc welding.

Still a further object of the present invention is the provision of a three stage power source, as defined above, which power source can adapt to a number of different third stage modules to change the welding process.

Still an additional object of the present invention is the provision of a novel three stage power source, which three stage power source includes an unregulated second stage for isolation with this stage combined with the input first stage and used to create an output welding signal (DC+, DC− or AC) for MIG welding, TIG welding, tandem welding and submerged arc welding.

A further additional object of the present invention is the provision of a novel chopper, as defined above, which novel chopper has two power switches with passive soft switching circuits.

These and other objects and advantages will become apparent from the following description taken together with the accompanying drawings.

BRIEF DESCRIPTION OF DRAWINGS

Three Stage Power Source

FIG. 1 is a block diagram illustrating a three stage power source and disclosing an embodiment of three stage power source improved by the invention;

FIG. 2 and FIG. 3 are block diagrams similar to FIG. 1 disclosing further embodiments of the three stage power source;

FIG. 9 is a block diagram showing the last two stages of the three stage power source wherein the output stage provides AC welding current;

FIG. 9A is a block diagram of a waveform technology control circuit for use in the three stage power source illustrated in FIG. 9, together with graphs showing three welding waveforms;

FIG. 10 is a block diagram illustrating a second and third stage of a three stage power source wherein the output stage is DC welding current;

The Welder Invention

Figure 22:
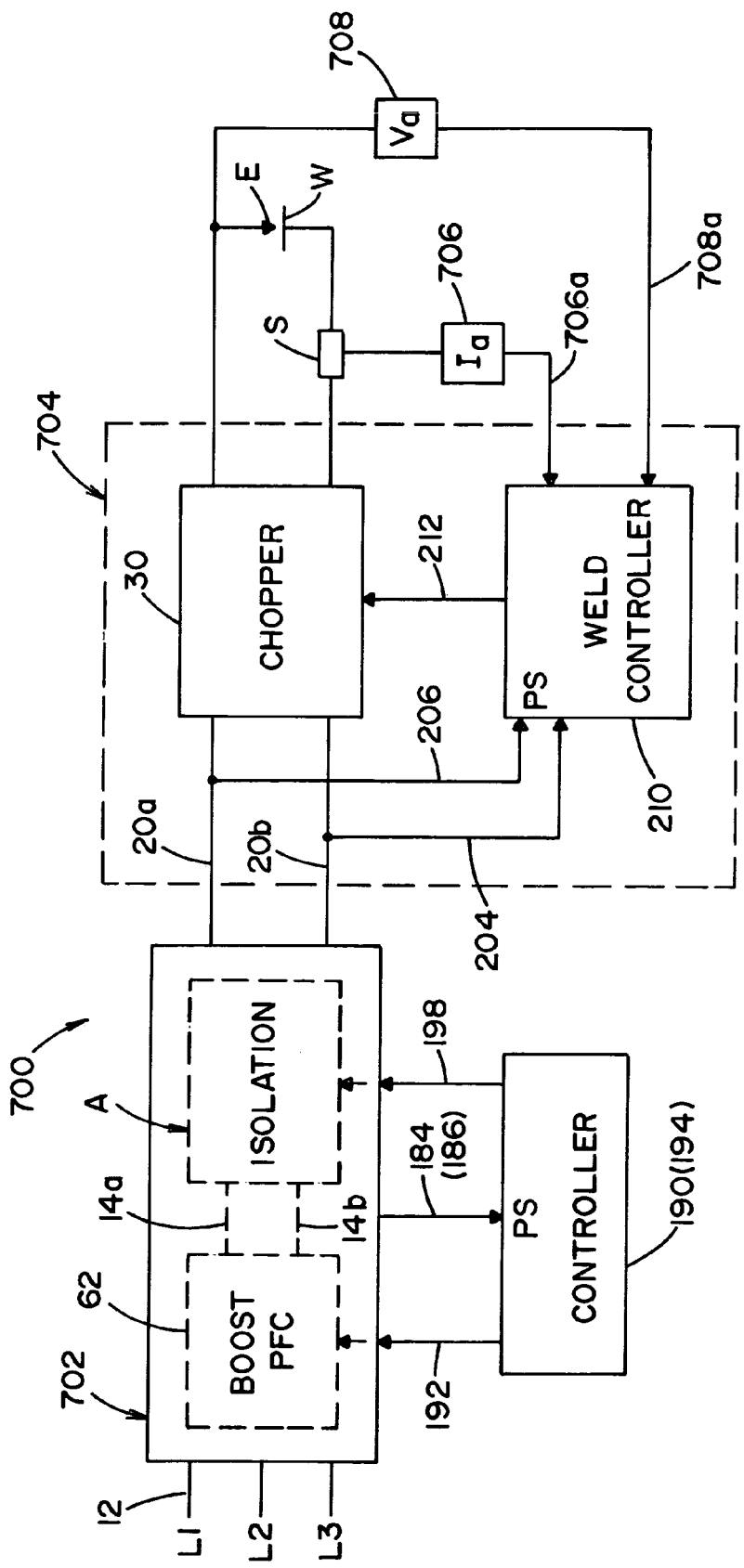
Figure 23:
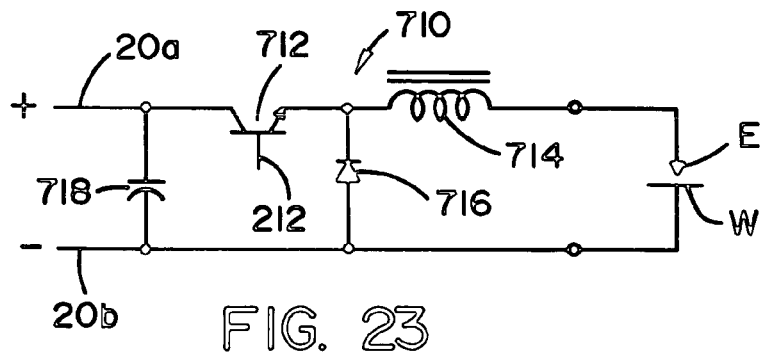
Figure 24:
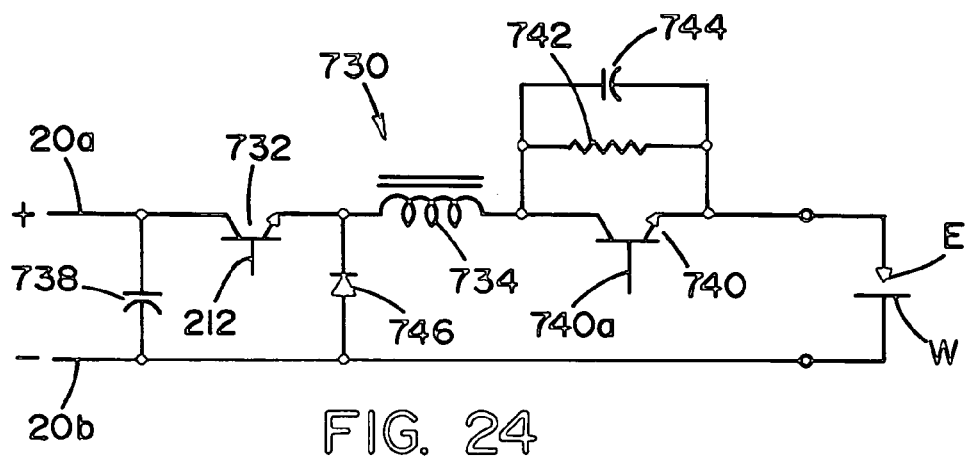
Figure 25:
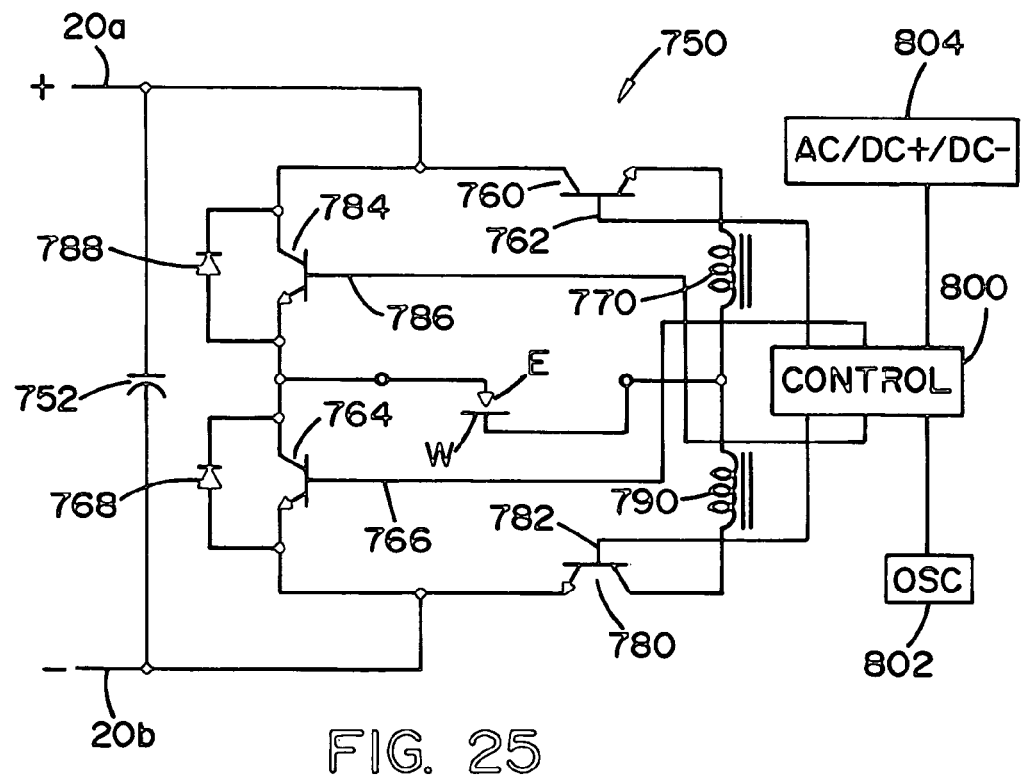
Figure 26:
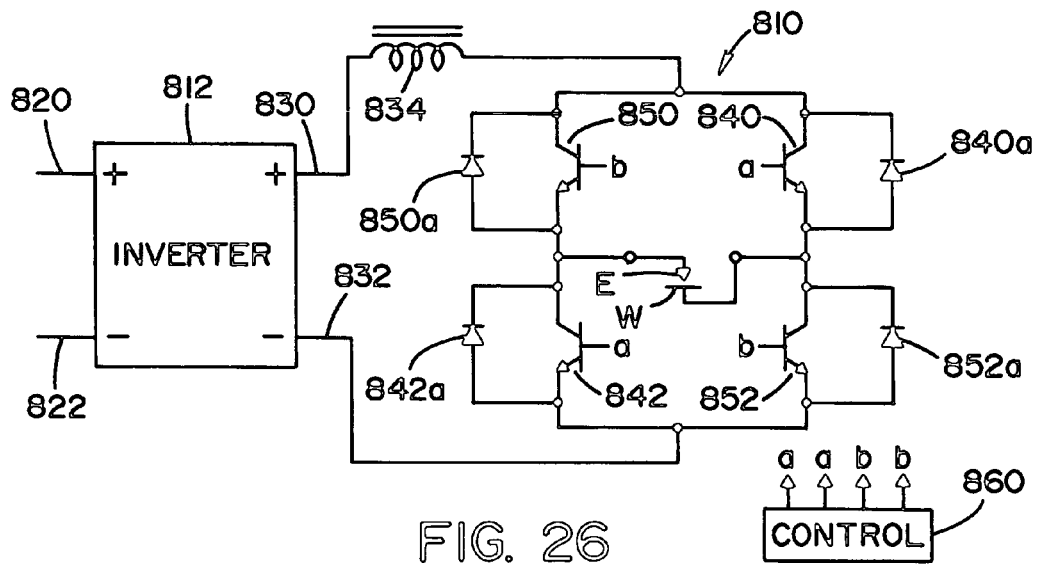
Figure 27:
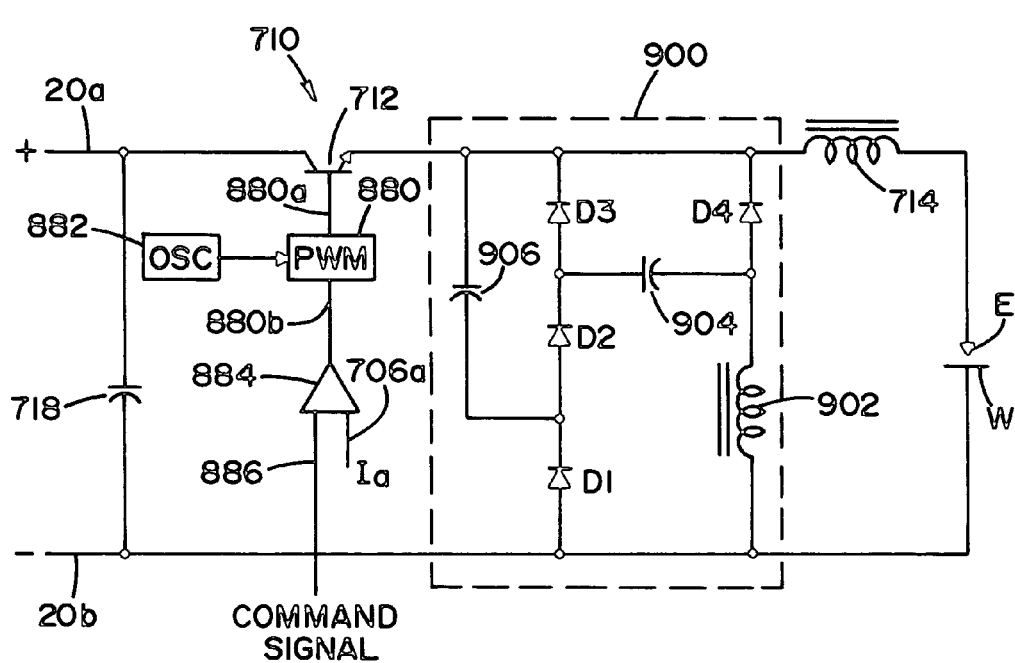
Figure 28:
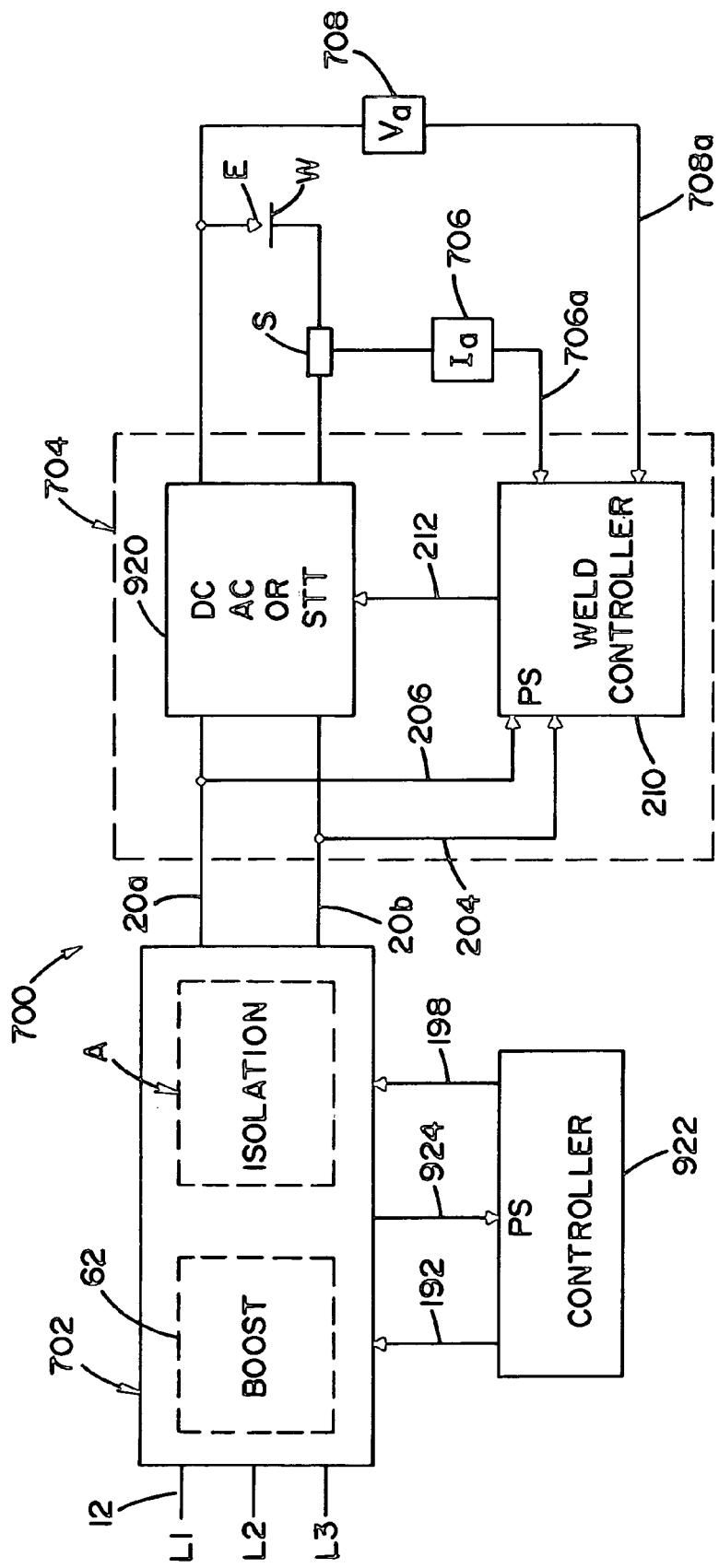
Figure 29:
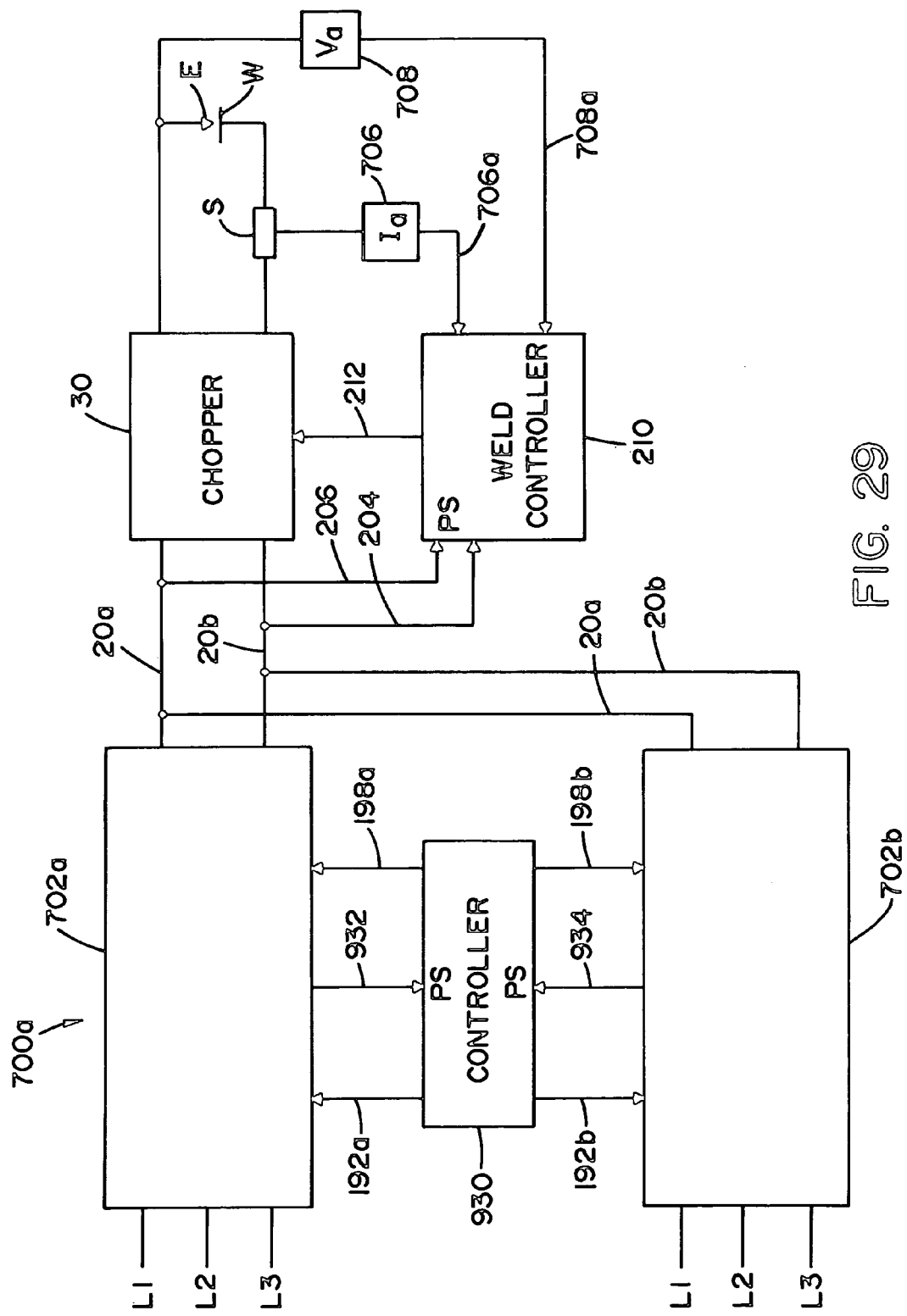

FIG. 22 is as wiring diagram describing the modularized three stage power source of the present invention;

FIG. 23 is a wiring diagram of a standard chopper used as the output module of the invention disclosed in FIG. 22;

FIG. 24 is a standard STT circuit used for the output module of the invention illustrated in FIG. 22;

FIG. 25 is a novel dual mode chopper circuit forming another aspect of the present invention and usable as the output module of the invention disclosed in FIG. 22;

FIG. 26 is a wiring diagram of a prior art output circuit for obtaining AC welding current which is improved by the novel chopper circuit of FIG. 25;

FIG. 27 is a detailed wiring diagram of the output chopper as shown in FIG. 23 with waveform technology control of the power switch and with a commonly used soft switching circuit for the power switch;

FIG. 28 is a combined block diagram and wiring diagram illustrating one advantage of the preferred embodiment shown in FIG. 22;

FIG. 29 is a combined block diagram and wiring diagram illustrating still a further advantage of the preferred embodiment illustrated in FIG. 22;

The Use Inventions

Figure 30:
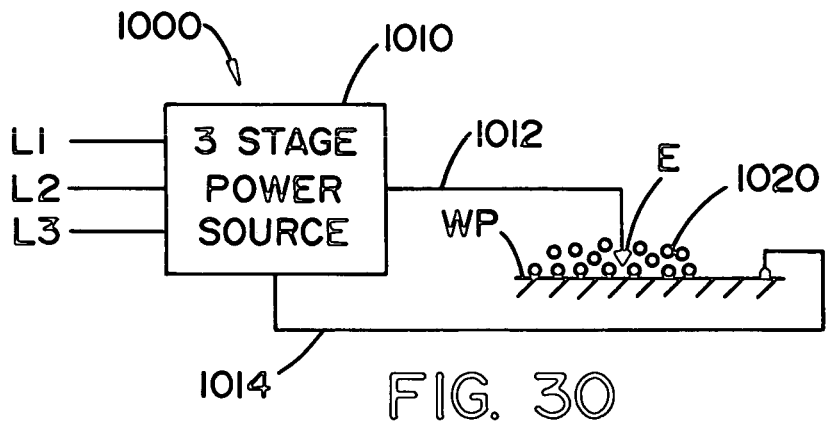
Figure 31:
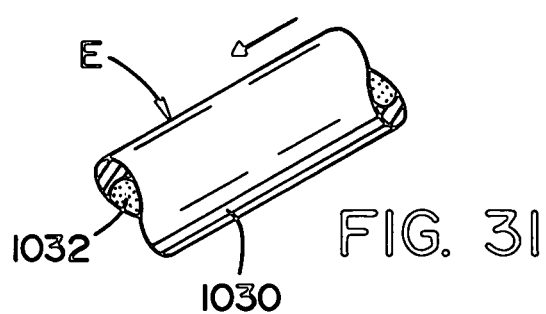
Figure 32:
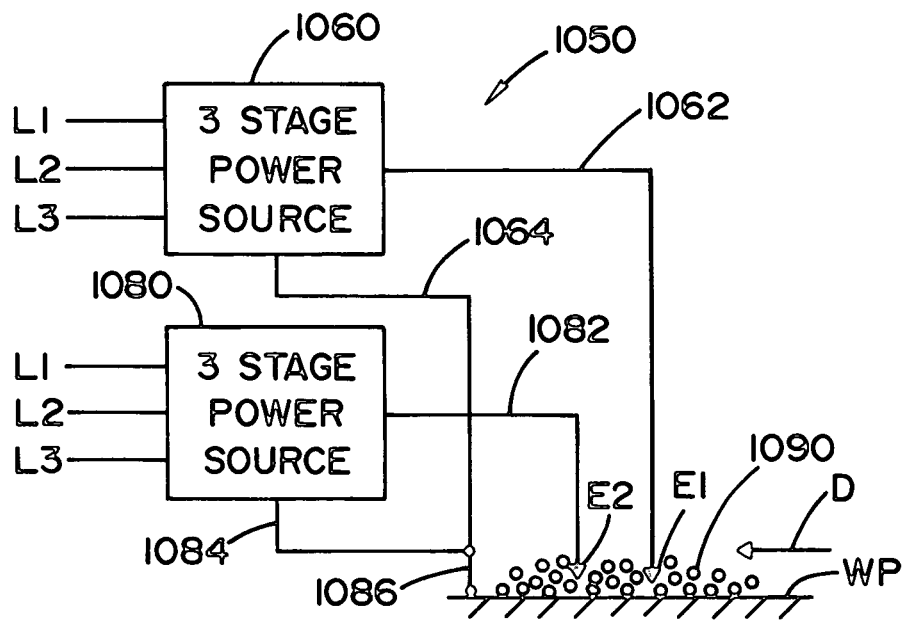
Figure 37:
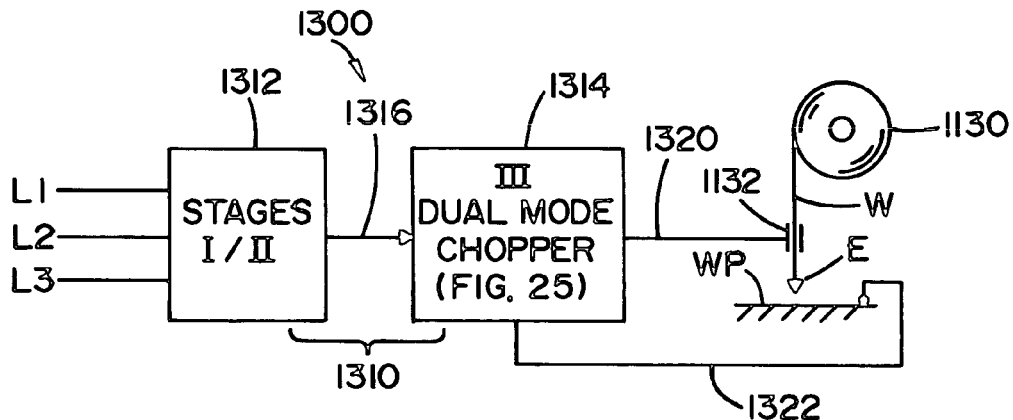
Figure 38:
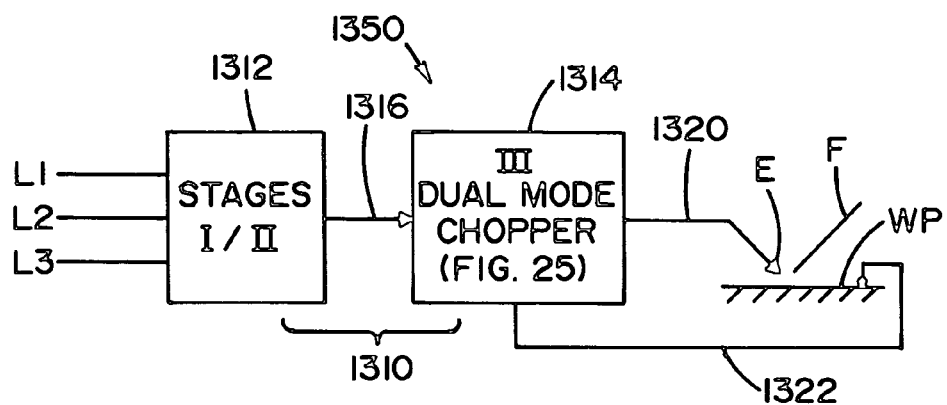
Figure 39:
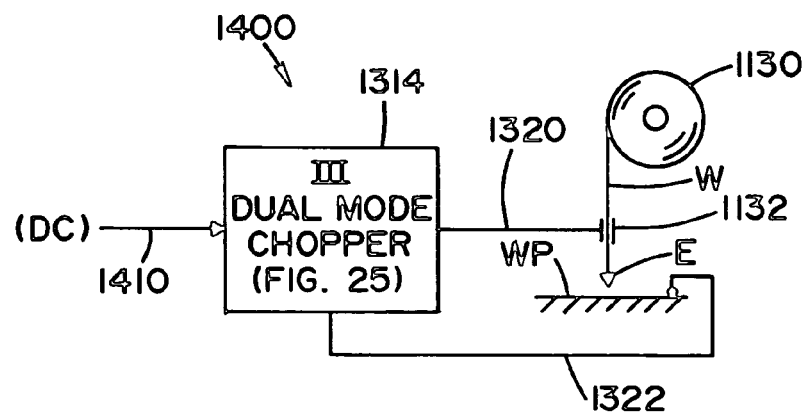
Figure 40:
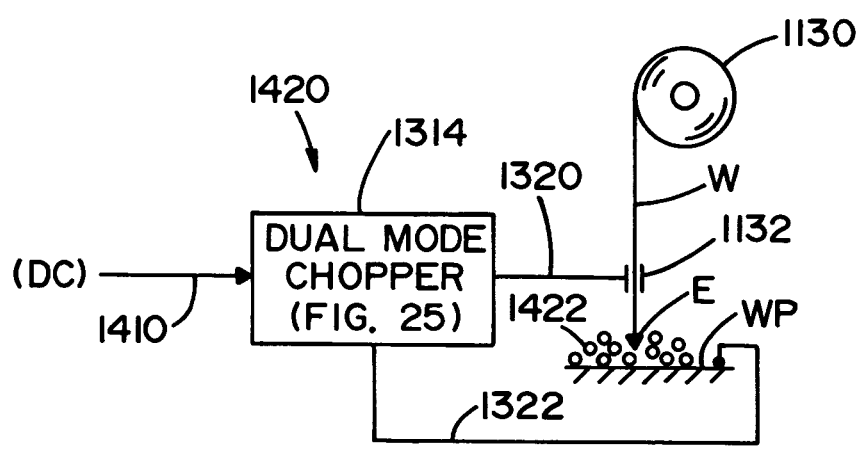
Figure 41:
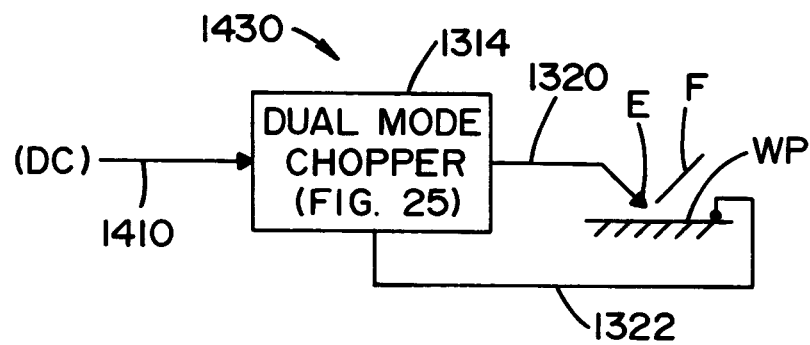

FIG. 30 is a schematic representation of the novel three stage power source combined with a submerged arc welding process;

FIG. 31 is a partial pictorial view illustrating a cored electrode which is preferably used in the combination methods schematically illustrated in FIGS. 30 and 32-41;

FIG. 32 is a schematic representation of two novel three stage power sources combined with a tandem welding process, which process is illustrated as a submerged arc process;

FIG. 33 is a schematic representation of the novel three stage power source combined with a TIG welding process either AC or DC;

FIG. 34 is a schematic representation of the novel three stage power source combined with a MIG welding process, either AC or DC;

FIG. 35 is a current diagram of an AC output welding signal generated by the novel three stage power source or the novel dual mode chopper of the present invention;

FIG. 36 is a current diagram of a DC output welding signal generated by the novel three stage power source or the novel dual mode chopper of the present invention, which signal can be either negative or positive;

FIG. 37 is a schematic representation of the novel dual mode chopper in the three stage power source combined with a MIG welding process, either submerged arc or otherwise;

FIG. 38 is a schematic representation of the novel dual mode chopper of the present invention as an output of the novel three stage power source combined with a TIG welding process, either AC or DC;

FIG. 39 is a schematic representation of the novel dual mode chopper with a generic DC input signal combined with a MIG welding process;

FIG. 40 is a schematic representation of the novel dual mode chopper as illustrated in FIG. 39 wherein the illustrated MIG welding process is a submerged arc process; and, FIG. 41 is a schematic representation of the novel dual mode chopper of the present invention, as illustrated in FIGS. 39-40, in combination with a TIG welding process, either AC or DC.

THREE STAGE POWER SOURCE

FIGS. 1-21

The present invention is a modification of a novel three stage power source for use in electric arc welding as developed by The Lincoln Electric Company and not prior art to the present invention. The new three stage power source has an input stage for converting an AC signal into a first DC output bus. This output bus has a fixed voltage level and is directed to the input of a second stage best shown in FIG. 17. This novel second stage of the three stage power source is an unregulated inverter which includes an isolation feature and has a second DC output or second DC bus which is proportional to the DC input bus. The level relationship is fixed by the construction of the unregulated inverter. The unregulated second stage inverter has a switching network wherein the switches are operated at a high switching frequency greater than 18 kHz and preferably about 100 kHz. The switching frequency of the switch network in the unregulated inverter forming the second stage of the power source allows use of small magnetic components. The isolated DC output of the unregulated inverter is directed to a third stage of the power source. This third stage can be either a chopper or inverter which is regulated by a welding parameter, such as current, voltage or power of the welding operation. In the modification this third stage is preferably a chopper. The topography of the three stage power source has an input stage to produce a first DC signal, a second unregulated DC to DC stage to provide an isolated fixed DC voltage or DC bus that is used by the third stage of the power source for regulating the current used in the welding operation. Three examples of a three stage power source to which the present invention is directed are illustrated in FIGS. 1-3. Power source PS1 in FIG. 1 includes first stage I, second stage II, and third stage III. In this embodiment, stage I includes an AC to DC converter 10 for converting AC input signal 12 into a first DC bus 14. The input 12 is an one phase or three phase AC line supply with voltage that can vary between 400-700 volts. Converter 10 is illustrated as an unregulated device which can be in the form of a rectifier and filter network to produce DC bus 14 identified as (DC#1). Since the AC input signal is a line voltage, DC bus 14 is generally uniform in magnitude. Unregulated inverter A is a DC to DC converter with an isolation transformer to convert the DC bus 14 (DC#1) into a second DC bus or second DC output 20 (DC#2). Output 20 forms the power input to stage III which is converter 30. The DC voltage on line 20 is converted by converter 30 into a current suitable for welding at line B. A feedback control or regulation loop C senses a parameter in the welding operation and regulates the current, voltage or power on line B by regulation of converter 30. In practice, converter 30 is a chopper, although use of an inverter is an alternative. By having a three stage power source PS1 as shown in FIG. 1, the switching network of the second stage has a frequency that is normally higher than the switching frequency of converter 30. Furthermore, the DC voltage in line 20 (DC#2) is substantially less than the DC voltage from stage I on line 14 (DC#1). In practice, there is an isolation transformer in inverter A. The transformer has an input or primary section or side with substantially more turns than the secondary section or side used to create the voltage on line 20. This turn ratio in practice is 4:1 so that the voltage on line 20 is ¼ the voltage on line 14.

The general topography of three stage power source to which the present invention is directed is illustrated in FIG. 1; however, FIG. 2 illustrates the preferred implementation wherein power source PS2 has essentially the same stage II and stage III as power source PS1; however, input stage I is an AC to DC converter 40 including a rectifier followed by a regulated DC to DC converter. The converted signal is a DC signal in line 14 shown as a first DC bus (DC#1). The voltage on line 14 is regulated as indicated by feedback line 42 in accordance with standard technology. Thus, in power source PS2 the output welding converter 30 is regulated by feedback loop C. The voltage on line 14 is regulated by feedback loop shown as line 42. Since converter 40 is a power factor correcting converter it senses the voltage waveform as represented by line 44. By using power source PS2, the first DC bus 14 is a fixed DC voltage with different one phase or three phase voltages at input 12. Thus, output 20 is merely a conversion of the DC voltage on line 14. DC#2 is a fixed voltage with a level determined by the isolation transformer and the fixed duty cycle of the switching network in unregulated inverter A. This is the preferred implementation of the novel power source employing three separate and distinct stages with stage II being an unregulated inverter for converting a fixed first DC output or DC bus to a second fixed DC output or DC bus used to drive a regulated welding converter, such as a chopper or inverter. As another alternative, stage I could be regulated by a feedback from the DC #2 bus in line 20. This is represented by the dashed line 46 in FIG. 2.

Power source PS3 in FIG. 3 is another implementation of the three stage power source. This is not the preferred implementation; however, the three stage power source of the present invention can have the input converter 50 regulated by feedback loop 52 from the welding current output B. With this use of a three stage power source, converter 50 is regulated by the welding output and not by the voltage on line 14 as in power source PS2. With regulation from welding output B, converter 50 is both a power factor correcting stage and a welding regulator. However, this implementation of the three stage power source is disclosed for a complete technical disclosure.

Figure 4:
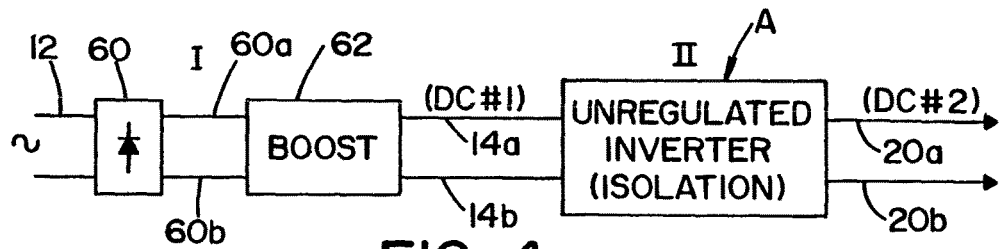
FIGS. 4-8 are partial block diagrams illustrating a three stage power source with different first stage embodiments.
Figure 5:
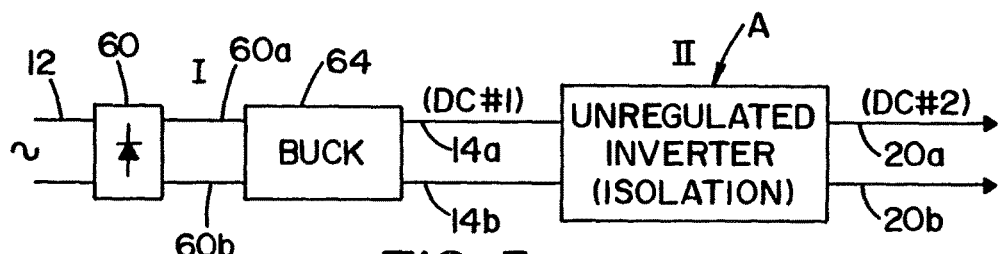
Figure 6:
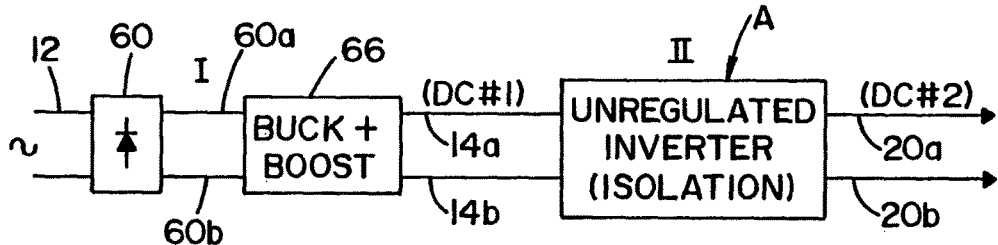
Figure 7:
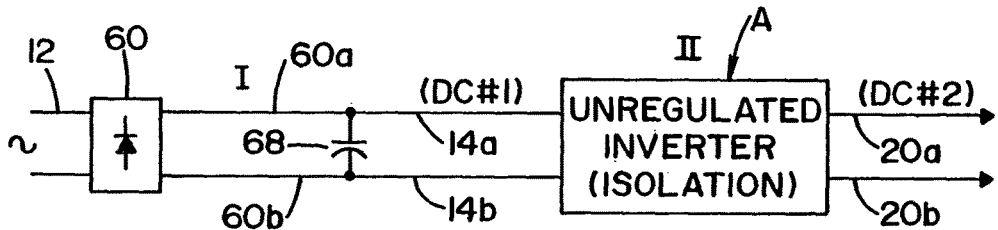
Figure 8:
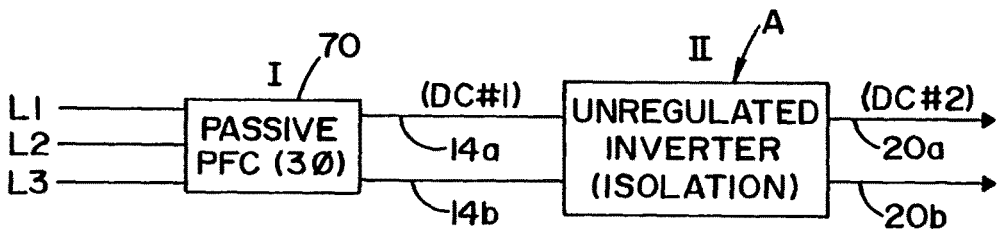

As previously described, input stage I converts either a single phase or a three phase AC signal 12 into a fixed DC bus 14 (DC#1) for use by the unregulated inverter A constituting second stage II. The novel three stage power source generally employs a DC to DC converter in stage I to produce the DC voltage indicated as line 14 in FIGS. 1-3. The DC to DC converter of stage I can be selected to create the desired voltage on line 14. Three of these converters are shown in FIGS. 4-6 wherein an input rectifier 60 provides a DC voltage in lines 60a, 60b to a DC to DC converter which may be a boost converter 62, a buck converter 64 or a buck+boost converter 66, as shown in FIG. 4, FIG. 5 and FIG. 6, respectively. By using these converters, the DC to DC converter of stage I incorporates a power factor correcting chip, which chip allows the power factor to be corrected thereby reducing the harmonic distortion at the input of the power source. The use of a power factor correcting input DC to DC converter is well known in the welding art and is used in many prior art two stage topographies. Converters 62, 64 and 66 preferably include a power factor correcting chip; however, this is not required. The main purpose of stage I is to provide a DC bus (DC#1) in line 14, which bus is indicated to be lines 14a, 14b in FIGS. 4-6 to produce a fixed DC voltage (DC#2) in line 20 indicated by lines 20a, 20b in the same figures. Power factor correction is not required to take advantage of the novel three stage topography. A non power factor correcting input stage is illustrated in FIG. 7 where the output lines 60a, 60b of rectifier 60 are coupled by a large storage capacitor 68 to produce a generally fixed voltage in lines 14a, 14b. Stage I in FIG. 7 does not incorporate a power factor correcting circuit or chip. However, the power source still involves three stages wherein the second stage is unregulated isolated inverter A to produce a generally fixed voltage on lines 20a, 20b. Another modification of input stage I is illustrated in FIG. 8 where a passive power factor correcting circuit 70 is connected to a three phase AC input L1, L2 and L3 to produce a generally fixed DC voltage across lines 14a, 14b, which lines constitutes the DC bus 14 (DC#1) at the input of inverter A. The disclosures of modified stage I in FIGS. 4-8 are only representative in nature and other input stages could be used with either single phase or three phase input signal and with or without power factor correcting.

By providing low fixed voltage on output bus 20 illustrated as lines 20a, 20b, the third stage of the novel three stage power source for welding can be a chopper or other converter operated at a frequency greater than 18 kHz. The switching frequencies of the unregulated inverter and the regulated output converter may be different. Indeed, normally the switching frequency of the chopper is substantially less than the frequency of unregulated inverter A. Power source PS4 shown in FIG. 9 illustrates the use of the present invention wherein stage III is a standard regulated converter 100 of the type used for electric arc welding. This converter is driven by fixed input DC bus 20 and is regulated by feedback from the welding operation 120 to provide current suitable for welding across output leads 102, 104. Leads 102 is a positive polarity lead and leads 104 is a negative polarity lead. In accordance with standard output technology for a two stage inverter based power sources, leads 102, 104 are directed to a standard polarity switch 110. This switch has a first position wherein lead 102 is directed to the electrode of the welding operation 120 so the output of polarity switch 110 has a positive polarity on output line 110a and a negative polarity on output line 110b. This produces an electrode positive DC welding process at weld operation 120. Reversal of polarity switch network 110 can produce an electrode negative DC welding process at weld operation 120. Thus, a DC welding process with either DC negative or DC positive can be performed according to the setting of the standard polarity switch 110. In a like manner, polarity switch 110 can be alternated between electrode negative and electrode positive to produce an AC welding process at weld operation 120. This is standard technology wherein polarity switch 110 drives the DC output from regulated converter 100 to produce either an AC welding process or a DC welding process. This process is regulated and controlled by a feedback system indicated as line or loop 122 directed to controller 130 for regulating converter 100 and for setting the polarity of switch 110 as indicated by lines 132, 134, respectively. By regulating the welding operation at stage III, the unregulated inverter at stage II can have a relatively higher switching frequency to reduce the component sizes within the second stage of the power source. The preferred embodiment of the three stage power source employs waveform control technology pioneered by The Lincoln Electric Company of Cleveland, Ohio. This type of control system is well known and is schematically illustrated in FIG. 9A wherein control circuit 150 processes a waveform profile as a voltage on line 152a is outputted from waveform generator 152. The waveform profile is controlled by feedback loop 122 as schematically illustrated by error amplifier 154 having an output 156. Thus, the profile of the waveform from generator 152 is controlled by the feedback loop 122 and produces a signal in output line 156. This line is directed to an appropriate pulse width modulator circuit 160 operated at a high frequency determined by the output of oscillator 162. This frequency is greater than 18 kHz and is often higher than 40 kHz. The regulated converter 100 preferably operates under about 100 kHz. The output of the pulse width modulator, which is normally a digital circuit within controller 130, is shown as line 132 for controlling the waveform by way of regulated converter 100. In accordance with standard practice, the waveform of inverter 100 can have any profile, either AC or DC. This feature is schematically illustrated as waveform 152b, 152c and 152d at the right portion of FIG. 9A. Waveform 152b is an AC waveform of the type used in AC MIG welding where a higher negative electrode amperage is provided. A higher positive amperage is also common. In waveform 152c, the amperage for both electrode negative and electrode positive is essentially the same with the length of the negative electrode portion being greater. Of course, a process for AC welding can be adjusted to provide balanced AC waveforms or unbalanced AC waveforms, either in favor of electrode negative or electrode positive. When polarity switch 110 is set for either a DC negative or a DC positive welding operation, a pulse welding waveform, shown as waveform 152d, is controlled by waveform generator 152. Various other waveforms, both AC and DC, can be controlled by controller 130 so the welding operation 120 can be adjusted to be AC, or DC. Furthermore, the welding operation can be TIG, MIG, submerged arc or otherwise. Any process can be performed by power source PS4 or other power sources using the present invention. The electrode can be non-consumable or consumable, such as metal cored, flux cored or solid wire. A shielding gas may or may not be used according to the electrode being employed. A modification of power source PS4 to perform only DC welding is illustrated as power source PS5 in FIG. 10. In this power source, welding operation 120 performs only a DC welding operation so that feedback loop 122 is directed to controller 170 having an output 172. Regulated converter 100a is preferably a chopper to produce a DC voltage across lines 102a, 104a. Controller 170 is controlled by waveform generator 152, as shown in FIG. 9A. The polarity on lines 102a, 104a is either electrode negative or electrode positive according to the demand of the DC welding process performed at welding operation 120. Regulated converter 100a is more simplified than the welding output of power supply PS4 shown in FIG. 9. FIGS. 9 and 10, together with the control network or circuit 150 shown in FIG. 9A, illustrates the versatility of the novel three stage power source.

Figure 11:
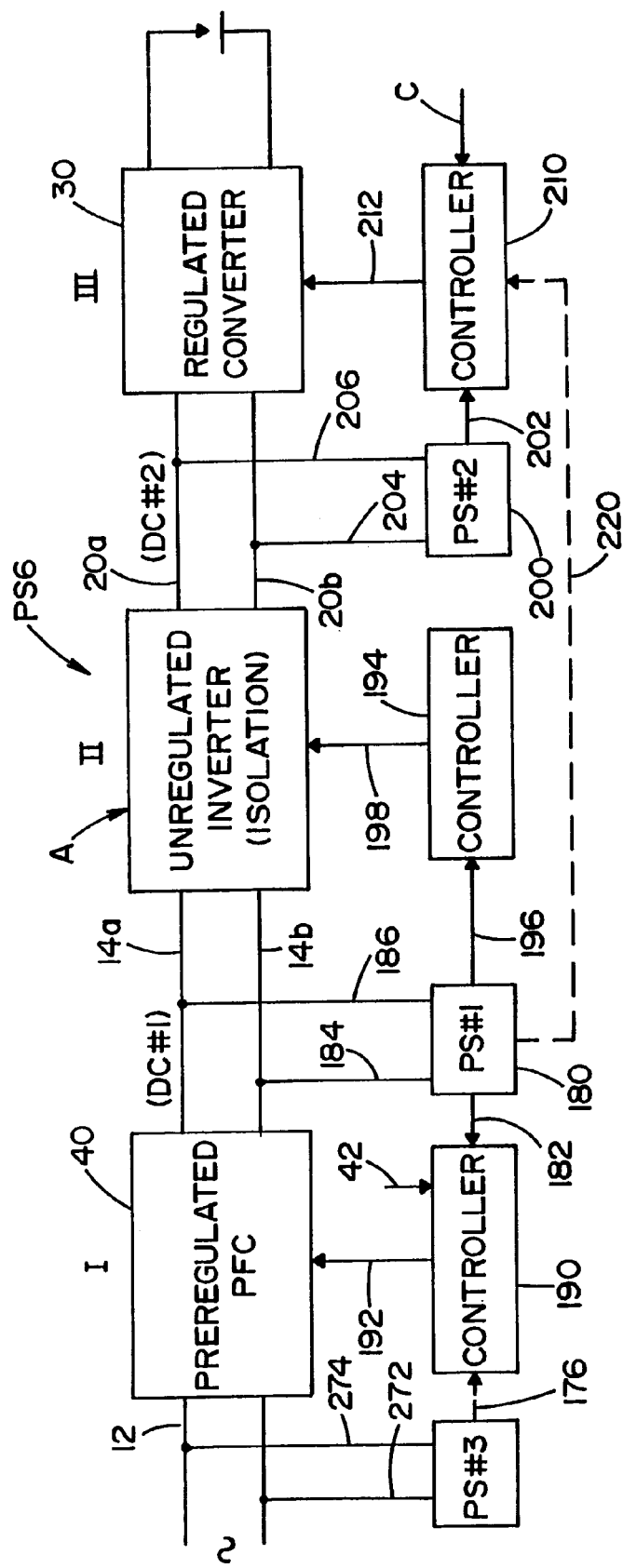
FIG. 11 is a block diagram illustrating the topography of the three stage power source for creating current suitable for electric arc welding with two separate controller control voltage supplies.

It is necessary to provide a voltage for operating the controllers for both the regulated and unregulated switching networks used in these two types of power sources. FIG. 11 illustrates the architecture and scheme employed to obtain control voltages to operate the various controllers of a three stage power source, such as power source PS6. The use of an output of a preregulator to provide the control voltage for the switching controller of the preregulator and switching controller of the second stage of a two stage power source is well known and is disclosed in Moriguchi U.S. Pat. No. 5,926,381, incorporated by reference herein. An output chopper for performing a welding operation routinely obtains the controller control voltage from the input DC voltage to the chopper. These two well known technologies are incorporated in power source PS6. The three stage power source can be operated with controllers having power supplies derived from various locations in the power source. Being more specific, power source PS6 has a power supply 180 with an output 182 and inputs 184, 186 from the first DC bus on leads 14a, 14b (DC#1). Power supply 180 includes a buck converter or flyback converter, not shown, to reduce the high voltage at the output of preregulator 40 of FIG. 2 to a low voltage on line 182. This control voltage may be between 5 and 20 volts. Voltage on line 182 is directed to controller 190 having an output lead 192 for performing the operation of preregulator 40 in accordance with standard technology. The preregulator has regulation feedback lines 42, 44 shown in FIGS. 2 and 3, but omitted in FIG. 11. Unregulated inverter A does not require a controller to modulate the duty cycle or the fixed relationship between the input and output voltages. However, it does require a controller 194 that receives controller operating voltage in line 196 from power supply 180. This arrangement is similar to the concept disclosed in Moriguchi U.S. Pat. No. 5,926,381, except second stage controller 194 is not a regulating controller as used in the two stage power source of the prior art. As an alternative, power supply PS#3 is driven by one phase of input 12 to give an optional power supply voltage shown as dashed line 176. Regulated output converter 30 of stage III has a power supply 200 labeled PS#2 with a controller voltage on line 202 determined by the voltage on DC bus 20 (DC#2) illustrated as including leads 20*a*, 20*b*. Again, power supply 200 includes a buck converter or flyback converter to convert the DC bus at the output of unregulated converter A to a lower voltage for use by controller 210 having an output 212. The signal on line 212 regulates the output of welding converter 30 in accordance with the feedback signal on line C, as discussed with respect to power sources PS1, PS2 in FIGS. 1 and 2, respectively. DC bus 14 (DC#1) and DC bus 20 (DC#2) provides input to power supplies 180, 200 which are DC to DC converters to produce low level DC control voltage for controllers 190, 194 and 210. As an alternative shown by dashed line 220, power supply 180 labeled PS#1 can provide control voltage for controller 210. FIG. 11 has been disclosed to illustrate the versatility of using a three stage power source with controllers that can receive reduced supply voltages from various fixed DC voltage levels indicated to be PS#1 and PS#2. Other arrangements could be employed for providing the controller voltage, such as a rectified connection to one phase of AC input voltage 12 by a transformer in a manner illustrated as PS#3.

Figure 12:
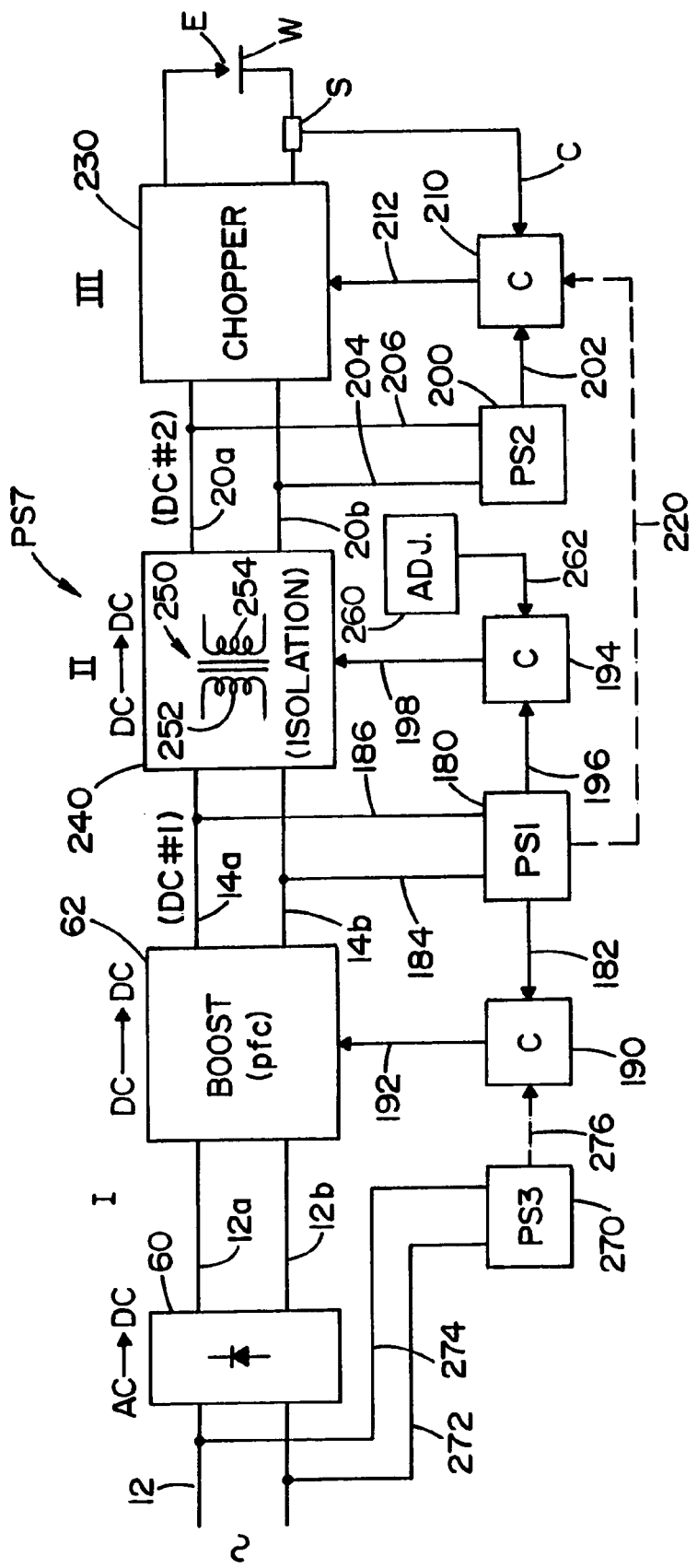
FIG. 12 is a block diagram illustrating a specific three stage power source employing the topography to which the present invention is directed.

Power source PS7 in FIG. 12 is similar to power source PS6 with components having the same identification numbers. The output stage III is a chopper 230 for directing a DC current between electrode E and workpiece W. Current shunt S provides the feedback signal C to controller 210. High switching speed inverter 240 of stage II has characteristics so far described with the isolation provided by transformer 250 having primary winding 252 and secondary winding 254. The primary side of DC to DC converter 240 is the switching network directing an alternating current to primary winding 252. The rectified output from secondary 254 is the secondary section or side of converter 240. Converter 240 employs a high switching speed inverter that has a duty cycle or phase shift set by controller 194. The switching frequency is about 100 kHz in the practical version of this power source. The duty cycle remains the same during the welding operation by chopper 230; however, the duty cycle or phase shift of the inverter may be adjusted as indicated by "ADJ" circuit 260 having an output 262 for adjusting controller 194. The duty cycle is normally close to 100% so that the switch pairs are conductive together their maximum times at the primary side of inverter 240. However, to change the fixed relationship between the first DC bus 14 and the second DC bus 20, circuit 260 can be used to adjust the duty cycle or phase shift. Thus, the unregulated, isolation inverter 240 is changed to have a different, but fixed duty cycle. However, the duty cycle normally is quite close to 100% so the switch pairs are operated essentially in unison. The duty cycle probably varies between 80-100% in normal applications of the three stage power source. In the preferred implementation of the novel power source, boost converter 62 shown in FIG. 4 is used for a power factor correcting input stage I. This boost converter is operated in accordance with controller 190 having a control voltage 182 as previously described. In accordance with a slight modification, supply 270 has a transformer connected by lines 272, 274 across one phase of a single phase or three phase AC input 12. A rectifier and filter in power supply 270 produces a low control voltage in optimal dashed line 276 for use instead of the control voltage in line 182 if desired. These two alternatives do not affect the operating characteristics of power source PS7. Other such modifications of a three stage power source for electric arc welding can be obtained from the previous description and well known technology in the welding field.

Figure 13:
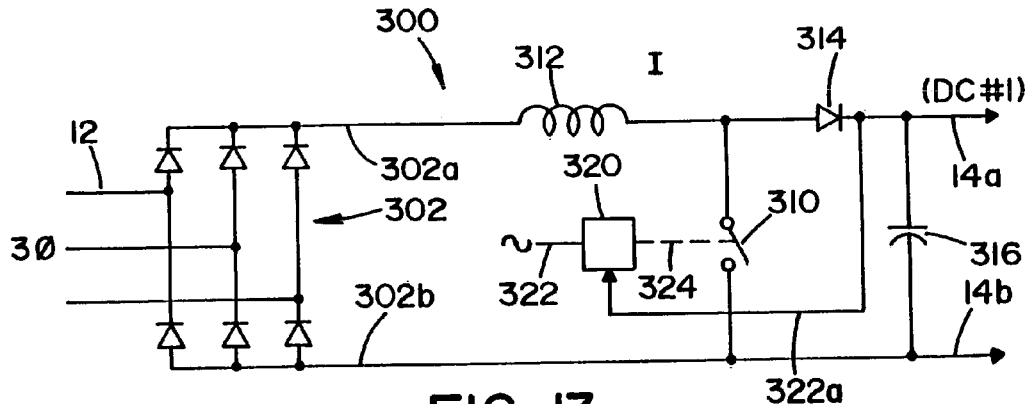
FIGS. 13-16 are wiring diagrams illustrating four different circuits for correcting the power factor in the first stage of the three stage power source.
Figure 14:
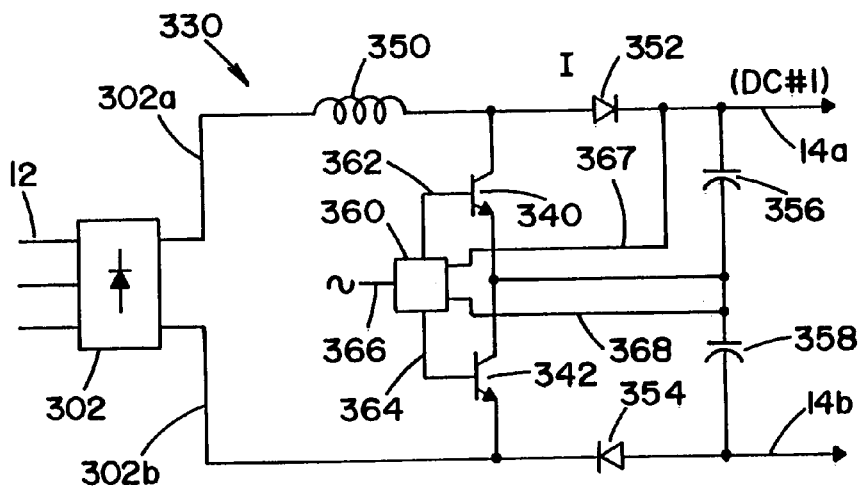
Figure 15:
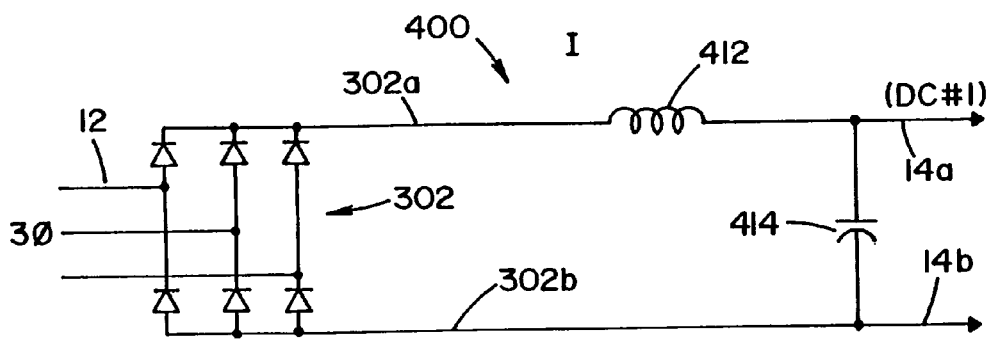
Figure 16:
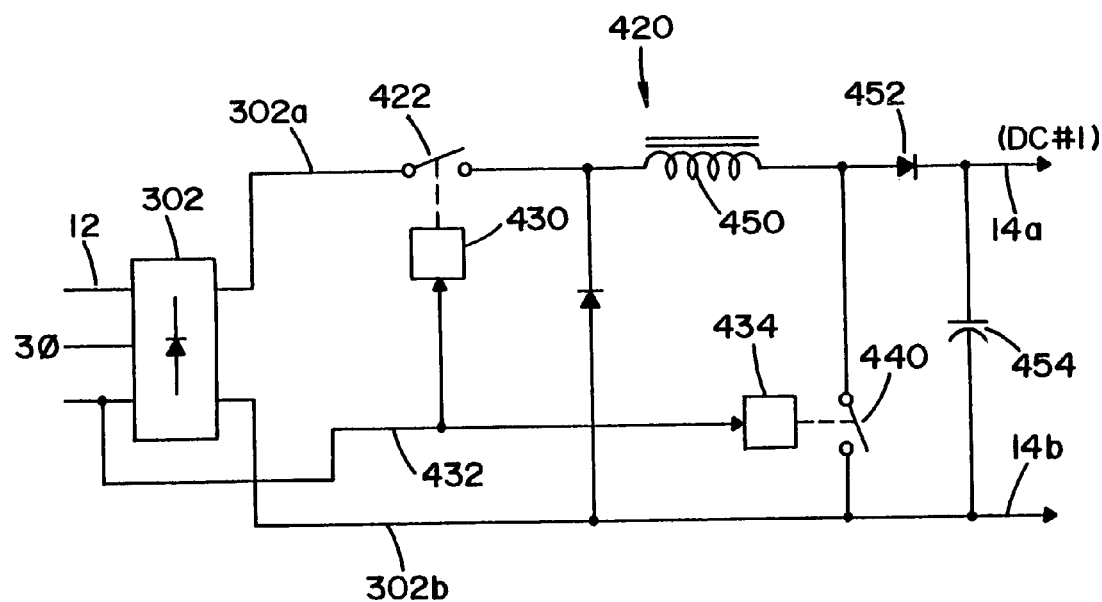

Input stage I normally includes a rectifier and a power factor correcting DC to DC converter as disclosed in FIGS. 4-8. These input stages can be used for both three phase and single phase AC signals of various magnitudes, represented as input 12. Certain aspects of an input stage for three phase AC input power are disclosed with respect to the circuits in FIGS. 13-16. Each of these circuits has a three phase input and a DC bus output (DC#1) that is obtained with a low harmonic distortion factor and a high power factor for the input stage. The disclosure in FIGS. 1-12 are generally applicable to the novel three stage power source; however, the particular stage I used is relevant to both a two stage power source of the prior art or the novel three stage power source. In FIG. 13, the input circuit 300 of stage I includes a three phase rectifier 302 with output leads 302*a*, 302*b*. Boost switch 310 is in series with an inductor 312, diode 314 and a parallel capacitor 316. An appropriate circuit 320 which is a standard power factor correcting chip has an input 322 to determine the input voltage, a regulation feedback line 322*a* and an output 324 for operating the boost switch to cause the current in input 12 to be generally in phase with the input voltage. This chip is a standard power factor correcting boost converter chip that can be used in the present invention and is also used for a normal two stage power source. In a like manner, input circuit 330 shown in FIG. 14 has a three phase rectifier 302 with output leads 302*a*, 302*b* as previously described. A boost circuit including inductor 350, diodes 352, 354 and capacitors 356, 358 are used in conjunction with switches 340, 342 to provide coordination of the current at the output of circuit 330 and input voltage 12. To accomplish this objective, a standard chip 360 provides gating pulses in lines 362, 364 in accordance with the sensed voltage in input 366 and feedback regulation signals in lines 367, 368. This is standard technology to provide power factor correction of the type that forms the input of a two stage power source or the novel three stage power source. It has been found that the active three phase circuits 300, 330 when operated on a three phase input provide an input power factor of about 0.95. The power factor of a stage I when having a single phase AC input can be corrected upwardly to about 0.99. Since a three phase power source can generally be corrected only to a lower level, it has been found that a passive circuit for the input stage I of a two stage or three stage power source is somewhat commensurate with the ability of an active power factor correcting circuit. A standard passive circuit 400 is shown in FIG. 15, wherein each of the three phases is rectified by three phase rectifier 302 which directs DC current through output leads 302*a*, 302*b* to a filter circuit including inductor 412 and capacitor 414. It has been found that a passive circuit such as shown in FIG. 15 can correct the power factor of the three phase input to a level generally in the range of about 0.95. This is somewhat the same as the ability of an active circuit for a three phase input circuit. A buck+boost input circuit 420 is shown in FIG. 16. Rectified current on lines 302*a*, 302*b* is first bucked by switch 422 using standard power factor correcting chip 430 having a line 432 having a voltage waveform signal from input 12, that also steers chip 434 to operate boost switch 440. Switches 422, 440 are operated in unison to control the input power factor using a circuit containing inductor 450, diode 452 and capacitor 454. Circuits 300, 330, 400 and 420 are standard three phase passive power factor correcting circuits using standard technology and available switches controlled by the input voltage waveform and the current of DC#1. FIGS. 13-16 are illustrative of certain modifications that can be made to the first stage of the three stage power source. Of course, there is other technology for improving the power factor and reducing the harmonic distortion of both DC and AC signals of the type used to drive power sources of electric arc welders.

Figure 17:
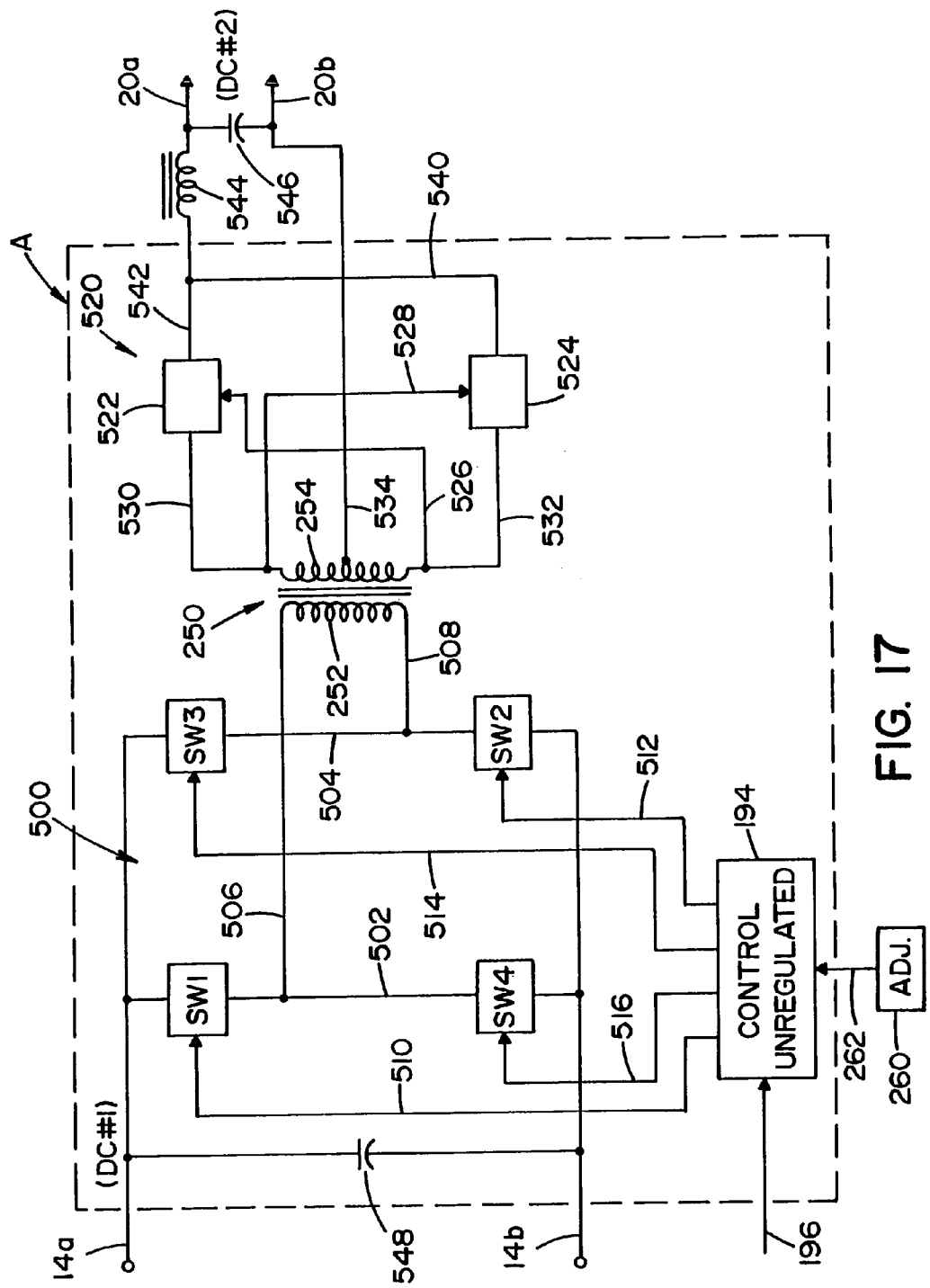
FIG. 17 is a combined block diagram and wiring diagram illustrating the preferred embodiment of the unregulated inverter constituting the novel second stage of a three stage power source to which the present invention is directed.

Unregulated inverter A of stage II can use various inverter circuits. The preferred circuit is illustrated in FIG. 17 wherein the inverter is divided between a primary section or side defined by the input to primary winding 252 of isolating transformer 250 and a secondary section or side defined by output of secondary winding 254. Referring first to the primary section or side of inverter A, full bridge circuit 500 is employed wherein paired switches SW1-SW2 and SW3-SW4 are across capacitor 548 are connected by leads 502, 504. The switches are energized in alternate sequence by gating pulses on lines 510, 512, 514, and 516, respectively. Controller 194 outputs gating pulses in lines 510-516 and an adjusted duty cycle determined by the logic on line 262 from circuit 260 as previously discussed. The duty cycle is controlled by changing the phase shift of lines 510 and 512 and lines 514 and 516. Circuit 260 adjusts the duty cycle or phse shift of the paired switches. This adjustment is fixed during the operation of inverter A. In practice, circuit 500 has about 50% duty cycle or phase shift, where each pair of switches has maximum periods of conduction. Preferably the duty cycle is about 100% or 80-100%. Controller 194 has a control voltage from an appropriate supply indicated by line 196, as also previously described. In operation of circuit 500, an alternating current is directed through primary winding 252. This current has an ultra high frequency normally at least about 100 kHz so the components can be reduced in size, weight and cost. The high switching frequency is not dictated by the welding operation, but is selected for efficiency of unregulated stage A of the three stage power source. The secondary section or side of inverter A is a rectifier 520 having synchronous rectifier devices 522, 524. Synchronous rectifier devices are well known in the general electrical engineering art and are discussed in Boylan U.S. Pat. No. 6,618,274 incorporated by reference herein. These devices are gated by signals on lines 526, 528 created at the opposite ends of secondary winding 254 in accordance with standard technology. Leads 530, 532, and 534 form the output leads of rectifier 520 to create a DC voltage (DC#2) across leads 20a, 20b. The current is smoothed by a choke 544 and is across capacitor 546, in accordance with standard welding technology. Inverter A is unregulated which means that it is not adjusted by a real time feedback signal from the welding operation. It merely converts DC bus 12 (DC#1) to DC bus 20 (DC#2). This conversion allows a substantial reduction in the voltage directed to the regulated third stage of the power source using inverter A. The reduction in voltage is primarily determined by the turns ratio of transformer 250, which ratio, in the preferred embodiment, is about 4:1. Thus, the fixed voltage on output bus 20 is about ¼ the fixed voltage on output bus 12 of the first stage. Several advantages of an unregulated stage are contained in an article entitled *The incredible Shrinking (Unregulated) Power Supply* by Dr. Ray Ridley incorporated by reference herein as background information. A basic advantage is the ability to increase the frequency to above 100 kHz to reduce the size and cost of the inverter stage.

Figure 18:
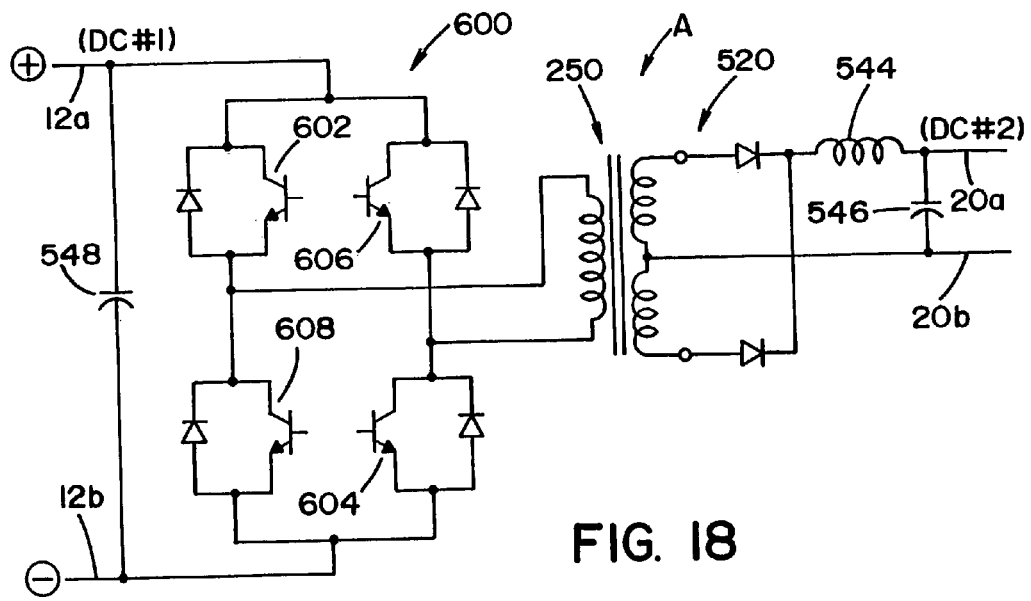
FIGS. 18-21 are wiring diagrams showing several inverters used as the second stage unregulated, isolation inverter comprising the novel aspect of the three stage power source to which the present invention is directed.
Figure 19:
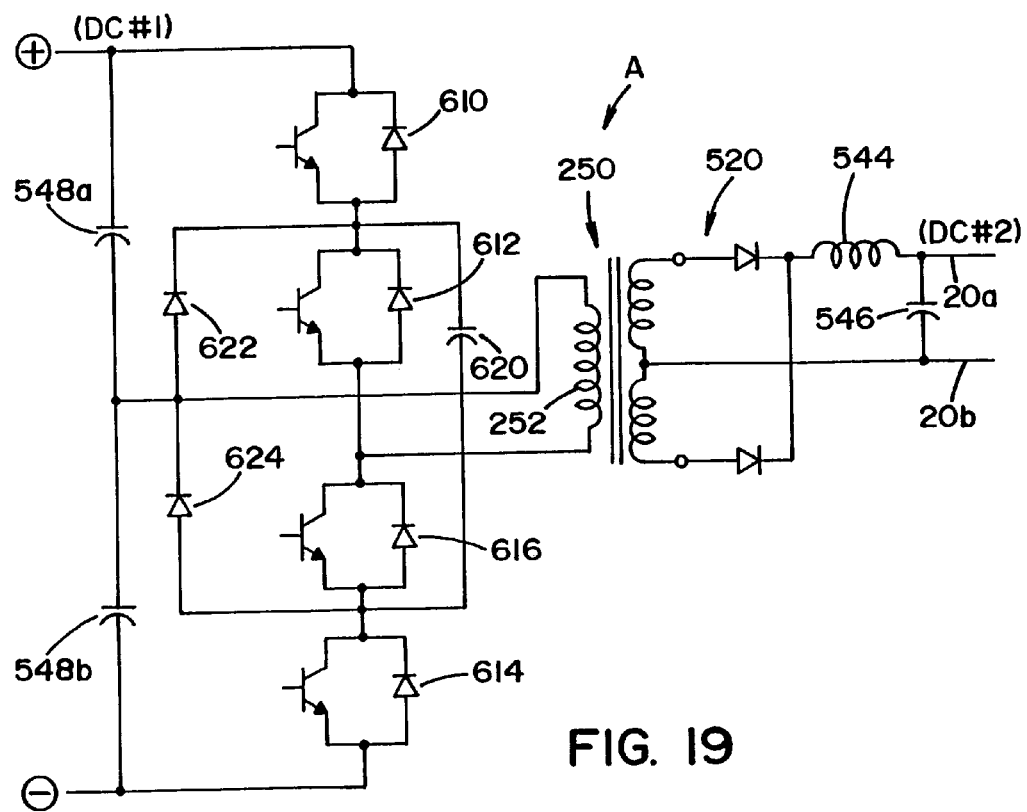
Figure 20:
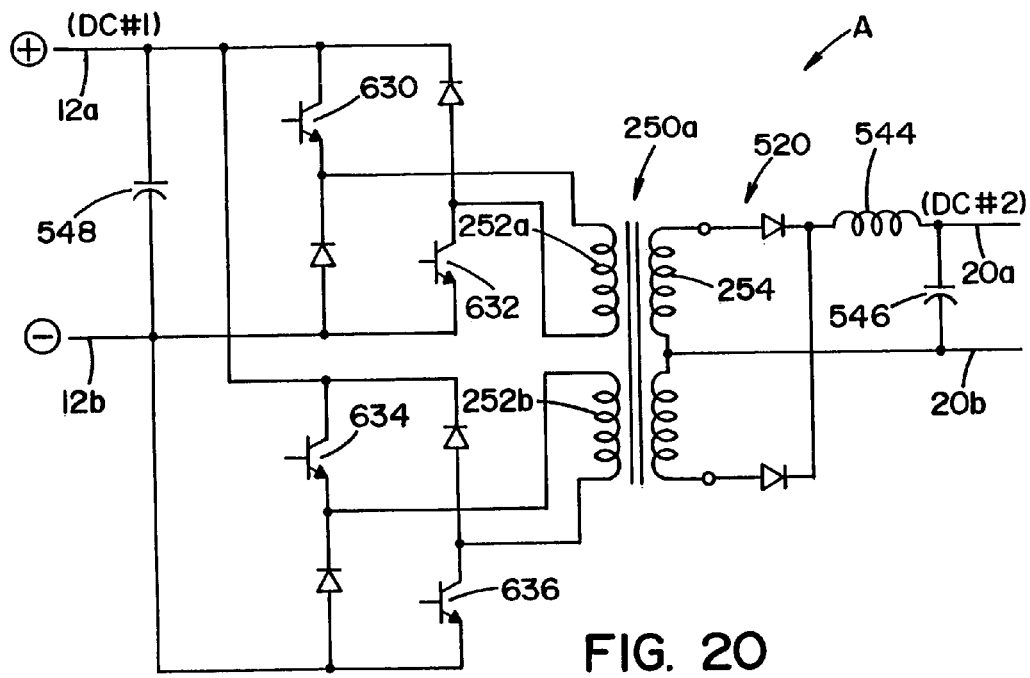
Figure 21:
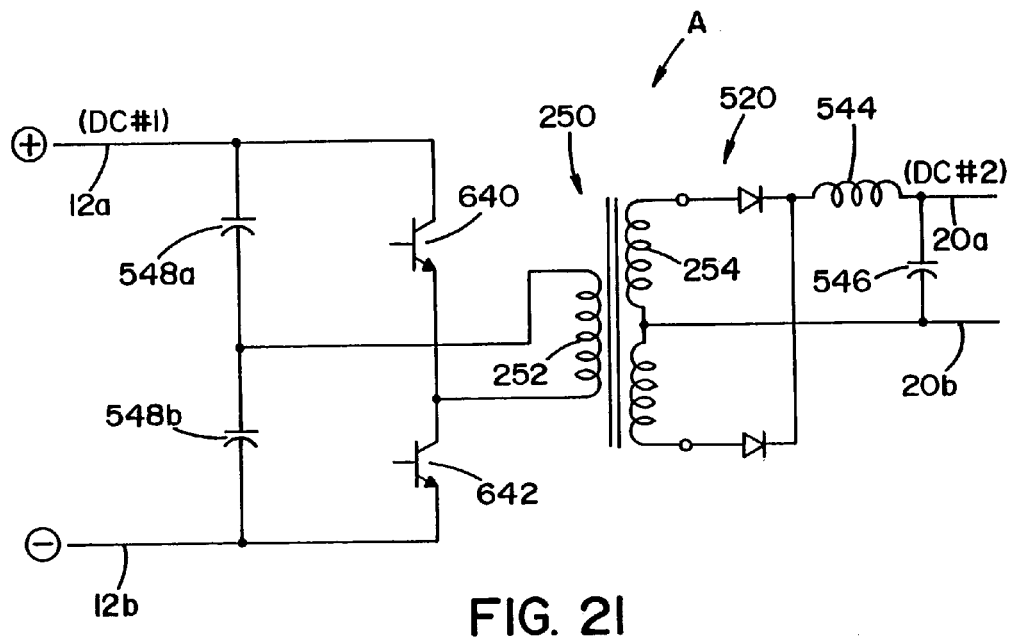

Various circuits can be used for the unregulated inverter A constituting novel stage II of the invention. The particular type of inverter is not controlling. Several inverters have been used. Some are illustrated in FIGS. 18-21. In FIG. 18, inverter A is shown as using a full bridge circuit 600 on the primary side of transformer 250. A switch and diode parallel circuit 602, 604, 606 and 608 are operated in accordance with the standard phase shift full bridge technology, as explained with respect to the inverter A version shown in FIG. 17. A modification of the internal workings for inverter A is illustrated in FIG. 19 utilizing a cascaded bridge with series mounted switch circuits 610, 612 and 614, 616. These switch circuits are operated similar to a half bridge and include input capacitors 548a, 548b providing energy for the switching circuits which in parallel is capacitor 620 and is in series with diode 622, 624. The two switch circuits are in series so there is a reduced voltage across individual switches when a phase shift control technique similar to the technique for the full bridge inverter of FIG. 17 is used. This type of inverter switching network is illustrated in Canales-Abarca U.S. Pat. No. 6,349,044 incorporated by reference herein showing an inverter using a cascaded bridge, sometimes referred to as a three level inverter. A double forward inverter is shown in FIG. 20 wherein switches 630, 632 provide a pulse in section 252a of the primary winding for transformer 250a. In a like manner, switches 634, 636 are operated in unison to provide an opposite polarity pulse in primary section 252b. The alternating pulse produces an AC at the primary winding of transformer 250a to produce an isolated DC output in secondary winding 254. A standard half bridge circuit is shown as the architecture of inverter A in FIG. 21. This half bridge includes switches 640, 642 alternately switched to produce an AC in primary winding 252 of transformer 250. These and other switching circuits can be used to provide an AC signal in the primary winding of transformer 250 so that the secondary isolated AC signal is rectified and outputted on leads 20a, 20b as DC#2. The mere description of certain representative standard switching networks is not considered to be exhaustive, but just illustrative. Control of the welding current is not performed in the second stage. In this stage, a DC bus having a high voltage is converted to a fixed DC bus (DC#2) having a low voltage for the purposes of driving a third stage, which third stage is a regulated stage to provide a current suitable for electric arc welding. Electric arc welding incorporates and is intended to include other welding related applications, such as the concept of plasma cutting. The various circuits used in the three stages can be combined to construct various architectures for the basic topography which is a three stage power source.

Preferred Embodiment

FIGS. 22-29

The three stage power source shown and described in FIGS. 1-21 constitute a substantial advance in the art of electric arc welding. The present invention involves this novel three stage power source, as generally represented in FIG. 11, formed into a modularized construction, as illustrated in FIG. 22. Power source 700 includes a first module 702 forming a fixed assembled frame on a single base. This module includes the first input stage 62 and the isolation or second stage, in the form of unregulated inverter A. As in FIG. 11, two controllers, shown in two stages such as controller 190 and controller 194, direct control signals on lines 192, 198 into the two separate stages of module 702.

The output of first module 702 are lines 20a, 20b (DC #2). This output voltage is directed to a separate, second module or frame 704. The second frame supports the output third stage of the controller, illustrated as chopper 30 in FIGS. 11 and 22. Weld controller 210 controls the output of chopper 30 through a signal on input line 212. This signal is generated by a pulse width modulator under the direction of a wave shaper or waveform generator in controller 210. Power to controller 210 is provided by the second DC bus by lines 204, 206. A feedback current signal from shunt S is received by current sensor circuit 706 that creates a signal on line 706a, representing the output or weld current of the welding operation. In a like manner, voltage sensor circuit 708 detects the voltage across the arc of the welding operation and provides a signal on line 708a representing the welding voltage. These two signals are directed into the feedback circuit of controller 210 to determine the chopper input signal on line 212. By mounting the output third stage on separate module 704, this module can be changed to modify the power source for performing different welding operations. Furthermore different choppers can be used as the third stage of power source 700. The power source is not mounted on a single module, but on an input module 702 and a separate last stage power module 704. Other advantages of this novel modularized construction will be discussed in the implementations of the invention shown in FIGS. 28 and 29.

FIGS. 23 and 24 show two output circuits for use on module 704. In FIG. 23, chopper 710 is mounted on replaceable module 704 to be operated by controller 210 with a signal on line 212. Chopper 710 includes power switch 712 controlled by high frequency signals on line 212. The signal is created by a pulse width modulator in controller 210. Power switch 712 directs current from input leads 20a, 20b through choke 714 to perform a welding operation between electrode E and workpiece W. Filter capacitor 718 is connected across the DC bus or leads 20a, 20b for controlling the voltage signal to chopper 710. This output chopper is releasably connected to the input leads 20a, 20b to the three stage power source 700 in FIG. 22. Thus, the three stage power source has an output chopper. An output chopper is the preferred embodiment of the invention; however, the separate module 704 can include another output circuit, such as the STT circuit 730 shown in FIG. 24. This STT circuit includes power switch 732 for directing current pulses through choke 734 to the welding operation between electrode E and workpiece W. The signal on line 212 forms an STT pulse profile at the welding operation. The STT waveform or profile is unique to The Lincoln Electric Company and is described in several patents, such as Parks U.S. Pat. No. 4,866,247 incorporated by reference herein. STT circuit 730 includes premonition switch 740 having an input 740a activated when the short circuit metal transfer is approaching a rupture of the metal neck between the electrode and workpiece. Just before the rupture occurs, switch 740 is closed to increase the current flow for the purposes of separating the short circuited molten metal. When the switch is opened, resistor 742 is connected in the series circuit including choke 734 and electrode E. Capacitor 744 controls the voltage across switch 740 when the switch is opened to transfer current flow to resistor 742. Diode 746 prevents current flow in the reverse direction in resistor 742 to discharge capacitor 744. Input filter capacitor 738 is connected between the DC bus formed by leads 20a, 20b. If an STT welding operation is to be performed by power source 700, module 730 shown in FIG. 24 is used to replace chopper module 710 shown in FIG. 23. These figures illustrate the interchageability of the output circuit on module 704 to perform different welding operations.

Another aspect of the present invention is a novel output chopper for use on module 704. This new output chopper is shown in FIG. 25, wherein chopper 750 has a dual mode of operation. It has two separate and distinct polarity paths. The first path include polarity switch 760 operated by control pulses on line 762. In series with polarity switch 760 and choke 770 is modulating switch 764 receiving gating pulses on line 766 and having free wheeling diode 788. Operation of polarity switch 760 and modulating switch 764 causes current flow across the gap between electrode E and workpiece W in a first polarity direction. A second path creates a current flow across the welding arc in the opposite polarity and includes polarity switch 780 receiving gating pulses on line 782. Corresponding modulating switch 784 has a gating signal line 786 and free wheeling diode 768. The choke 790 in the second polarity path corresponds to choke 770 in the first polarity path. Switch signal control device 800 creates signals in line 762 and line 766 for operating the first polarity path. In a like manner, signals in line 782 and line 786 causes a current flow in the opposite polarity path. Control 800 has a frequency determined by oscillator 802 and involves a pulse width modulator in the controller in digital format. Device 804 selects the mode of operation. This device allows one of the polarity paths to be operated to merely provide a standard chopper circuit in either the positive or negative direction. By alternating the pulses to the two polarity paths, an AC output signal is created. The modulating switches 764, 784 are essentially the power switches of the two chopper modes in chopper 750. This is a chopper circuit to provide an AC output. A separate and distinct polarity switch as shown in FIG. 9 is not required. Dual mode chopper 750 is novel for electric arc welding and essentially employs a chopper that can be reversed in polarity and can be operated in an AC mode. Thus, the welding operation between electrode E and workpiece W can be shifted between different modes while using the same circuit and with the advantage of a chopper concept. Chopper 750, when operated in the AC mode, is a substantial improvement over the prior art AC welding power source, illustrated in FIG. 26. This prior unit is a full bridge output circuit having separate polarity paths with a double forward bias voltage drop. There is no chopper concept. Voltage 810 is driven by inverter 812 used to convert DC link 820, 822 to output DC bus 830, 832. This DC bus drives the full bridge through choke 834. Bridge 810 has switches 840, 842 operated by leads a and switches 850, 852 driven by leads b. The signals to the switches are created by controller 860 to alternate between the two sets of power switches, each of which has an anti-parallel diode 840a, 842a, 850a and 852a, respectively. The dual mode chopper shown in FIG. 25 can provide not only AC operation, but also output modulating. This is a substantial improvement over bridge 810 and does not need an input inverter 812. Any of the output modules disclosed in FIGS. 23, 24 and 25 can be used in the three stage power source 700, as schematically illustrated in FIG. 22. Module 704 with one of these circuits is used as the output stage connected to two stage input module 702.

In accordance with another aspect of the present invention, the output chopper of module 704 is provided with a soft switching circuit 900, as best shown in FIG. 27. Chopper 710 of FIG. 23 has power switch 712 driven by pulse width modulator 880 at a frequency controlled by oscillator 882. The output 880a of pulse width modulator 880 is controlled by input 880b under the control by comparator 884 that compares a command signal from a wave shaper or waveform generator on line 886 with the feedback circuit signal on line 706*a*. This is the normal operation for a chopper. Soft switching circuit 900 is a commonly used soft switching circuit. The circuit includes an inductor 902 for controlling current across the power switch and diode D4. Capacitor 906 controls the voltage across the power switch during the switching operations. Capacitors 904 and 906 are connected as shown in FIG. 27 using diodes D1, D2, D3 and D4. These capacitors control the voltage across switch 712. Inductor 902 controls the current through diode D4. Thus switch 712 and diode D4 are soft switched in both the current and voltage during switching operations. This circuit is shown in the University of California article entitled *Properties and Synthesis of Passive, Loseless Soft-Switching PWM Converters*. This May 1997 article is incorporated by reference herein to explain further the operation of the commonly used circuit 900. In essence, chopper 710 has a power switch with a soft switching circuit to control both the current and voltage during turn-on and turn-off sequences of the power switch. The same type of soft switching circuit is employed for power switches 760, 780 of dual mode chopper 750. In other words, the output chopper on module 704 is provided with a soft switching circuit, which soft switching circuit controls both voltage and current at the appropriate time during the switching operations.

FIGS. 28 and 29 illustrate two advantages of modularizing power source 700. In FIG. 28, module 704 is provided with output power stage 920, which may be a DC chopper as shown in FIG. 23, an AC chopper as shown in FIG. 25 or an STT circuit shown in FIG. 24. By using the invention, different modules 704 can be connected to input module 702 for building different types of power sources, while maintaining the novel three stage topography. Controller 922 combines the functions of controllers 190, 194 shown in FIGS. 11 and 22 and receives control voltage from line 924. Turning now to FIG. 29, a second advantage of using the modularized three stage power source of the invention is illustrated. Two separate input modules 702*a*, 702*b* are connected in parallel by interconnecting the output leads 20*a*, 20*b* from each of the two input modules. Thus, chopper 30 has an input level which is higher than available from a single module 702. Of course, more than two input modules could be employed to create a substantial amount of welding current at the input of chopper 30. In FIG. 29, power source 700*a* includes the two input modules 702*a*, 702*b* which are controlled in unison by controller 930 through output lines 192*a*, 198*a* and output lines 192*b* and 198*b*. Control voltage is provided by the DC bus in modules 702*a*, 702*b* by lines 932, 934, respectively. Thus, by using a modularized three stage power source of the present invention, the output stage can be selectively changed or the input stage can be parallel. Paralleling of smaller modules reduces the number of modules needed from a wide range of power levels. Two advantages of modularization are illustrated in FIGS. 28 and 29. Other advantages are apparent to create versatility while maintaining the advantage of the novel three stage power source shown in FIGS. 1-21.

Preferred Methods

FIGS. 30-41

The novel three stage power source disclosed in FIGS. 1-21 and the novel dual mode chopper shown in FIG. 25 has been developed to perform a large number of welding processes. FIGS. 30-41 illustrate the combination of such power sources with these welding processes. In FIG. 30, submerged arc MIG welding process 1000 employs novel three stage power source 1010 having output leads 1012, 1014. Lead 1014 can be a ground lead in accordance with standard technology. The submerged arc welding process involves electrode E movable along workpiece WP and surrounded, at the workpiece, by a mass of granulated flux material 1020. As electrode E moves with respect to workpiece WP, the electrode plows through granular flux 1020 to protect the welding arc and molten metal puddle prior to solidification. In accordance with an aspect of the invention the welding process is performed by the three stage power source disclosed in FIGS. 1-21. In one embodiment of the invention, electrode E is a flux cored electrode, as shown in FIG. 31 wherein the electrode is a wire including an outer metal sheath 1030 surrounding an internal core 1032 containing flux. A flux cored electrode also includes granular material for alloying with the steel of sheath 1030. The inclusion of alloy agents does not change the definition of the electrode as being a "flux cored" electrode. If there is no flux, the electrode can still be a "cored" electrode with metal alloying material in granular form surrounded by sheath 1030. The several welding processes disclosed herein can employ a solid wire, a metal cored electrode or a flux cored electrode, the latter being preferred and schematically illustrated in FIG. 31.

In accordance with another aspect of the invention, the three stage power source of FIGS. 1-21 is used in combination with tandem welding process 1050, as illustrated in FIG. 31. This process uses three stage power source 1060 having output leads 1062, 1064. A welding signal is directed to electrode E1 movable in direction D along workpiece WP. The second electrode E2 receives a welding signal from three stage power source 180 having output leads 1082, 1084. The output leads of both power sources are connected to workpiece WP by lead 1086. By moving electrodes E1 and E2 along workpiece WP in direction D, a tandem welding process is performed. This process is illustrated as being a submerged arc process using granular flux 1090. The MIG tandem process of FIG. 32 need not be the submerged arc process and can merely use a flux cored electrode, as shown in FIG. 31. When using the granular flux of a submerged arc welding process, the electrodes are normally solid metal or metal cored.

The three stage power source of the present invention is combined with any welding process, such as TIG welding process 1100 shown in FIG. 33. Power source 1110 has output leads 1112, 1114 between electrode E and workpiece WP. The TIG welding process utilizes a tungsten electrode E, which electrode is not consumed during welding. To provide additional metal for the TIG welding process, filler metal rod F can be used. A similar combination of the three stage power source for generic MIG welding process 1120 is illustrated in FIG. 34. Power source 1122 has output leads 1124, 1126. Electrode E is a welding wire, flux cored or otherwise stored in a supply, illustrated as spool 1130. Consequently, welding wire W is moved through contact tip 1132 into the welding process at workpiece WP. In accordance with standard MIG technology, lead 1124 is connected to contact tip 1132 for directing a welding signal to electrode E. This generic MIG welding process uses, in combination, the three stage power source disclosed in FIGS. 1-21.

The various welding output signals shown in FIGS. 35 and 36 are created by either the novel three stage power source disclosed in FIGS. 1-21 or the dual mode chopper illustrated in FIG. 25. In FIG. 35, AC welding signal 1200 includes positive portion 1202 and negative portion 1204.

These portions are created by a series of closely spaced current pulses 1210 created by waveform technology, where the magnitude of each pulse is determined by a pulse width modulator under the control of a wave shaper or waveform generator. This is in accordance with standard technology pioneered by The Lincoln Electric Company of Cleveland, Ohio. The AC welding signal of FIG. 35 can be replaced by DC welding signal 1250, as shown in FIG. 36. Peak current 1252 can be a fixed value, either positive polarity or negative polarity. In the illustrated embodiment, welding signal 1250 is a pulse signal, wherein peak level 1252 is preceded by ramp up portion 1254 and followed by ramp down portion 1256. This provides a pulse above background level 1258. In accordance with the preferred embodiment of the invention, the waveform is produced by a series of individual current pulses 1260 created by a pulse width modulator under the control of wave shaper or waveform generator.

The process and power source combinations illustrated in FIGS. 30-36 are preferably performed by the novel dual mode chopper output stage as illustrated in FIG. 25. This concept is illustrated in FIGS. 37 and 38. In FIG. 37, MIG welding process 1300, which can be a submerged arc process by using granular flux, is illustrated as being combined with three stage power source 1310 having an input two stage module 1312 directing the output signal from the unregulated isolation DC to DC converter to dual mode chopper 1314. The DC signal driving chopper 1314 is in line 1316. The output welding signal on lead 1320 is a signal such as shown in FIGS. 35 and 36. The welding signal is connected to contact tip 1132 for the MIG welding process 1300. TIG welding process 1350 combined with power source 1310 is illustrated in FIG. 38. The previously used numbers for the various components are used in FIG. 38. A welding signal as shown in FIGS. 35 and 36 is directed to tungsten electrode E by output lead 1320. Filler metal rod F is used to provide additional metal during the DC TIG welding process. Generally this filler metal is not employed for AC TIG welding, although it is available. Generic MIG welding process 1300 and generic TIG welding process 1350, as illustrated in FIGS. 37, 38, respectively, are novel combinations using dual mode chopper 710 disclosed in FIG. 25.

Dual mode chopper 750, as shown in FIG. 25, can be driven by a DC signal from various isolated input power sources to perform the combined welding processes. Use of a generic DC driving signal is illustrated in FIGS. 39-41, wherein like numbers as previously used correspond to the same or like components. A MIG welding process 1400 is illustrated in FIG. 39, wherein generic DC input 1410 is converted by dual mode chopper 1314 to create an AC or DC welding signal at contact tip 1132. The MIG welding process 1400 of FIG. 39 is converted to a submerged arc MIG welding process 1420 in FIG. 40. This conversion is accomplished by adding granular flux material 1422 around electrode E to protect the arc and molten metal puddle of the welding process. A dual mode chopper with a generic input DC driving signal 1410 is combined with a power source to provide TIG welding process 1430, illustrated in FIG. 41. The AC or DC welding signal on lead 1320 is used by tungsten electrode E for TIG welding at workpiece WP.

As illustrated in FIGS. 30-41, the novel three stage power source shown in FIGS. 1-21 and the novel dual mode chopper as disclosed in FIG. 25 are combined with certain welding processes to create novel methods, which novel methods form another aspect of the present invention. The methods illustrated in FIGS. 30-41 disclose the invention of combining welding processes with the novel power sources of the present invention.

Having thus defined the invention, the following is claimed:

1. A power source for an electric arc welding process, said power source comprising:
   a first module including:
      an input stage having an AC input and a first DC output signal;
      a second stage in the form of an unregulated DC to DC converter, unregulated by a feedback signal from the electric arc welding process, having an input configured to receive said first DC output signal, a controller configured to operate a network of switches at a frequency greater than 18 kHz with a duty cycle to convert said received first DC output signal into a first internal AC signal, an isolation transformer with a primary winding driven by said first internal AC signal and a secondary winding for creating a second internal AC signal, and a rectifier to convert said second internal AC signal into a second DC output signal of said second stage, with a magnitude related to said duty cycle of said switches; and
   a second module including a third stage to convert said second DC output signal to a welding output for welding in said process, said input stage and said second stage being assembled into said first module and said third stage being assembled into said second module so as to be releasably connectable to said first module.

2. The power source as defined in claim 1 wherein said input stage includes a rectifier and a power factor correcting converter.

3. The power source as defined in claim 2 wherein said power factor correcting converter is a boost converter.

4. The power source as defined in claim 2 wherein said power factor converter is a buck converter.

5. The power source as defined in claim 4 wherein said third stage of said second module is a chopper with a power switch operated at a given frequency.

6. The power source as defined in claim 5 wherein said power switch has a soft switching circuit.

7. The power source as defined in claim 6 wherein said soft switching circuit is passive.

8. The power source as defined in claim 5 wherein said chopper is a dual mode chopper with a first polarity path with a first power switch and a first polarity switch and a second polarity path with a second power switch and a second polarity switch.

9. The power source as defined in claim 8 including a second controller with a first mode alternately operating said chopper between said first and second polarity paths and a second mode operating said chopper in only one of said polarity paths.

10. The power source as defined in claim 9 wherein said first and second polarity switches each have a soft switching circuit.

11. The power source as defined in claim 10 wherein said soft switching circuits are passive.

12. The power source as defined in claim 8 wherein said first and second power switches each have a soft switching circuit.

13. The power source as defined in claim 12 wherein said soft switching circuits are passive.

14. The power source as defined in claim 3 wherein said third stage of said second module is a chopper with a power switch operated at a given frequency.

15. The power source as defined in claim 14 wherein said power switch has a soft switching circuit.

16. The power source as defined in claim 15 wherein said soft switching circuit is passive.

17. The power source as defined in claim 14 wherein said chopper is a dual mode chopper with a first polarity path with a first modulating switch and a first polarity switch and a second polarity path with a second modulating switch and a second polarity switch.

18. The power source as defined in claim 17 including a second controller with a first mode alternately operating said chopper between said first and second polarity paths and a second mode operating said chopper in only one of said polarity paths.

19. The power source as defined in claim 18 wherein said first and second modulating switches each have a soft switching circuit.

20. The power source as defined in claim 19 wherein said soft switching circuits are passive.

21. The power source as defined in claim 17 wherein said first and second modulating switches each have a soft switching circuit.

22. The power source as defined in claim 21 wherein said soft switching circuits are passive.

23. The power source as defined in claim 2 wherein said third stage of said second module is a chopper with a power switch operated at a given frequency.

24. The power source as defined in claim 23 wherein said power switch has a soft switching circuit.

25. The power source as defined in claim 24 wherein said soft switching circuit is passive.

26. The power source as defined in claim 23 wherein said chopper is a dual mode chopper with a first polarity path with a first modulating switch and a first polarity switch and a second polarity path with a second modulating switch and a second polarity switch.

27. The power source as defined in claim 26 including a controller with a first mode alternately operating said chopper between said first and second polarity paths and a second mode operating said chopper in only one of said polarity paths.

28. The power source as defined in claim 27 wherein said first and second polarity switches each have a soft switching circuit.

29. The power source as defined in claim 28 wherein said soft switching circuits are passive.

30. The power source as defined in claim 26 wherein said first and second modulating switches each have a soft switching circuit.

31. The power source as defined in claim 30 wherein said soft switching circuits are passive.

32. The power source as defined in claim 1 wherein said third stage of said second module is a chopper with a power switch operated at a given frequency.

33. The power source as defined in claim 32 wherein said power switch has a soft switching circuit.

34. The power source as defined in claim 33 wherein said soft switching circuit is passive.

35. The power source as defined in claim 32 wherein said chopper is a dual mode chopper with a first polarity path with a first modulating switch and a first polarity switch and a second polarity path with a second modulating switch and a second polarity switch.

36. The power source as defined in claim 35 including a second controller with a first mode alternately operating said chopper between said first and second polarity paths and a second mode operating said chopper in only one of said polarity paths.

37. The power source as defined in claim 36 wherein said first and second polarity switches each have a soft switching circuit.

38. The power source as defined in claim 37 wherein said soft switching circuits are passive.

39. The power source as defined in claim 35 wherein said first and second modulating switches each have a soft switching circuit.

40. The power source as defined in claim 39 wherein said soft switching circuits are passive.

41. The power source as defined in claim 1 wherein said third stage of said second module is a circuit with a power switch to perform an STT welding process.

42. The power source as defined in claim 41 wherein said power switch has a soft switching circuit.

43. The power source as defined in claim 42 wherein said soft switching circuit is passive.

44. A power source for an electric arc welding process, said power source comprising:
a first module including:
an input stage having an AC input and a first DC output signal;
a second stage in the form of an unregulated DC to DC converter, unregulated by a feedback signal from the electric arc welding process, having an input configured to receive said first DC output signal, a controller configured to operate a network of switches at a frequency greater than 18 kHz with a duty cycle to convert said received first DC output signal into a first internal AC signal, an isolation transformer with a primary winding driven by said first internal AC signal and a secondary winding for creating a second internal AC signal, and a rectifier to convert said second internal AC signal into a second DC output signal of said second stage, said second stage having a fixed relationship between input and output voltages of the second stage; and
a second module including a third stage to convert said second DC output signal to a welding output for welding in said process, said input stage and said second stage being assembled into said first module and said third stage being assembled into said second module so as to be releasably connectable to said first module.

45. The power source as defined in claim 44, further comprising:
a duty cycle adjustment circuit connected to said controller and configured to adjust said duty cycle is between different predetermined values.

46. The power source as defined in claim 44 wherein said input stage includes a rectifier and a power factor correcting converter.

47. The power source as defined in claim 46 wherein said power factor correcting converter is a boost converter.

48. The power source as defined in claim 46 wherein said power factor correcting converter is a buck+boost converter.

49. The power source as defined in claim 44 wherein said third stage is a circuit to perform an STT welding process with a power switch.

50. The power source as defined in claim 49 wherein said power switch is operated at a frequency over 18 kHz.

51. The power source as defined in claim 50 wherein said power switch is operated by a pulse width modulator.

52. The power source as defined in claim 44 wherein said third stage of said second module is a chopper with a power switch operated at a given frequency.

53. The power source as defined in claim 52, wherein said power switch has a soft switching circuit.

54. The power source as defined in claim 1, wherein the duty cycle is fixed to a predetermined value during operation of said second stage.

55. The power source as defined in claim 54, further comprising:
   a duty cycle adjustment circuit connected to said controller and configured to adjust said predetermined value of said fixed duty cycle to a different predetermined value.

56. The power source as defined in claim 54, wherein said duty cycle can be fixed at various levels.

57. The power source as defined in claim 54, wherein said predetermined value fixes said duty cycle in a range from 80% to 100%.

58. The power source as defined in claim 54, wherein said predetermined value fixes said duty cycle to about 100%.

59. The power source as defined in claim 1, wherein said frequency is between 18 kHz and 100 kHz.

60. The power source as defined in claim 1, wherein said second stage includes a smoothing choke connected to said rectifier to smooth second DC output signal.

61. The power source as defined in claim 60, wherein said second stage further includes a capacitor connected to said smoothing choke and said rectifier to smooth second DC output signal.

62. The power source as defined in claim 44, wherein the duty cycle is fixed to a predetermined value during operation of said second stage.

63. The power source as defined in claim 62, wherein said duty cycle can be fixed at various levels.

64. The power source as defined in claim 62, wherein said predetermined value fixes said duty cycle in a range from 80% to 100%.

65. The power source as defined in claim 62, wherein said predetermined value fixes said duty cycle to about 100%.

66. The power source as defined in claim 44, wherein said frequency is between 18 kHz and 100 kHz.

67. The power source as defined in claim 44, wherein said second stage includes a smoothing choke connected to said rectifier to smooth second DC output signal.

68. The power source as defined in claim 67, wherein said second stage further includes a capacitor connected to said smoothing choke and said rectifier to smooth second DC output signal.

* * * * *